United States Patent [19]
Pittet et al.

[11] 3,914,227

[45] Oct. 21, 1975

[54] CERTAIN CYCLOALKYL PYRAZINYL KETONES

[75] Inventors: Alan O. Pittet, Atlantic Highlands; Ranya Muralidhara, Fair Haven; Joaquin F. Vinals, Red Bank, all of N.J.; Alton Dewitt Quinn, Calicoon, N.Y.; Manfred Hugo Vock, Locust, N.J.; Edward J. Shuster, Brooklyn, N.Y.

[73] Assignee: International Flavors & Fragrances Inc., New York, N.Y.

[22] Filed: Oct. 23, 1973

[21] Appl. No.: 410,704

[52] U.S. Cl.............. 260/250 B; 131/71; 252/522; 260/90 R; 260/290 HL; 426/65
[51] Int. Cl.².................................. C07D 241/10
[58] Field of Search....... 260/250 B, 250 R, 250 BN

[56] References Cited
UNITED STATES PATENTS

| | | | |
|---|---|---|---|
| 2,677,686 | 5/1954 | Smith et al. | 260/250 B |
| 3,402,051 | 9/1968 | Roberts | 260/250 B X |
| 3,544,682 | 12/1970 | Taylor | 260/250 B X |
| 3,764,349 | 10/1973 | Mookherjee | 260/250 BC |
| 3,767,428 | 10/1973 | Mookherjee | 260/250 B |

FOREIGN PATENTS OR APPLICATIONS

| | | | |
|---|---|---|---|
| 1,156,484 | 6/1969 | United Kingdom | 260/250 B X |
| 2,128,744 | 10/1972 | France | 260/250 B |
| 6,503,794 | 10/1965 | Netherlands | 260/250 B |

OTHER PUBLICATIONS

Wang, J., Agr. Food Chem. 21, (5), 868–869 (1973).
Sax, N. Irving, Dangerous Properties of Industrial Materials, 3rd Ed., N.Y. Reinhold, (1969) p. 934.

*Primary Examiner*—R. Gallagher
*Attorney, Agent, or Firm*—Arthur L. Liberman, Esq.; Harold Haidt, Esq.

[57] ABSTRACT

The disclosure herein relates to compounds such as pyrazinyl cycloalkyl ketones and to their use in altering the organoleptic properties of consumable materials.

2 Claims, No Drawings

CERTAIN CYCLOALKYL PYRAZINYL KETONES

BACKGROUND OF THE INVENTION

The present invention relates to novel nitrogen heterocyclic compounds and compositions using nitrogen heterocyclic compounds including the aforesaid novel nitrogen heterocyclic compounds to alter the flavor and/or aroma of consumable materials. In addition, the present invention relates to novel methods for producing the foregoing nitrogen heterocyclic compounds.

There has been considerable work performed relating to substances which can be used to impart (or enhance) flavors to (or in) various consumable materials. These substances are used to diminish natural material requirements, when, for example, some of the natural materials may be in short supply, and to provide more uniform properties in the finished product. Green, green vegetable, green pepper, licorice, anise, sweet licorice, star anise, spicey, pear, walnut, cocoa powder, and chocolate milk tastes and green, green vegetable-like, green pepper-like, floral, woody, nutty, sweet green, sweet cocoa, valerian oil-like, lavendin-like, fruity and pear aromas are particularly desirable for flavor uses. Green, natural green, floral, woody, jasmin-like, hyacinth-like, sweet, nicotine, tobacco, and salicylate aromas are particularly desirable in perfume compositions. Sweet, burnt cocoa and spicey notes are particularly desirable in tobacco.

In the U.S. Pat. No. 3,716,543 issued on Feb. 13, 1973 certain alkadienyl, cycloalkenyl, cycloalkylidenealkyl, cycloalkylalkenyl and cycloalkenylalkyl substituted heterocyclic nitrogen compounds, particularly pyridines and pyrazines having the general formula:

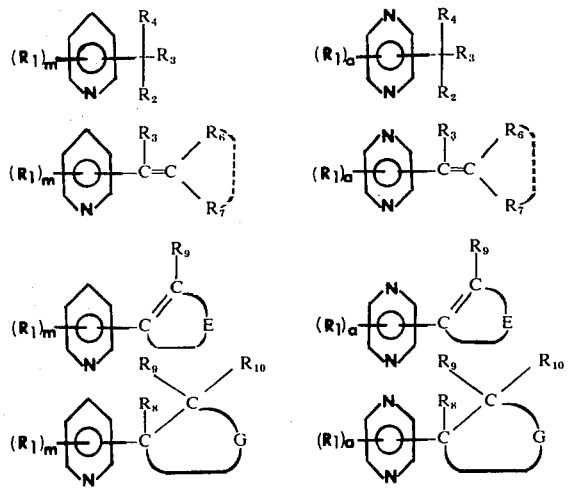

wherein $m$ is 1,2,3 or 4; and wherein $n$ is 1,2 or 3; wherein the $R_1$ group (or groups) is (are) substituent(s) on one or more of the carbon atoms which are part of the heterocyclic rings; wherein $R_1$ is either hydrogen or alkyl including but not limited to, methyl, ethyl, propyl, butyl, pentyl and heptyl; wherein each of $R_2$ and $R_4$ are separately hydrogen, methyl or ethyl; wherein the sum of the number of carbon atoms in $R_2$ and $R_4$ (taken together) is from 0 up to 2; wherein the sum of the number of carbon atoms in $R_2$, $R_3$ and $R_4$ (taken together) is from 10 up to 13; wherein $R_3$ is C-9 C-10, C-11 or C-12 alkadienyl, cycloalkenyl, cycloalkylalkenyl, cycloalkylidenealkyl and cycloalkenylalkyl; wherein $R_5$ is hydrogen, methyl or ethyl; wherein one of $R_6$ and $R_7$ is alkenyl and the other of $R_6$ and $R_7$ is hydrogen or lower alkyl, or $R_6$ and $R_7$ taken together form a cycloalkyl group, wherein the sum of the number of carbon atoms in $R_5$, $R_6$ and $R_7$ is from 8 up to 11; wherein $R_9$ and $R_{10}$ each represents hydrogen or lower alkyl, including but not limited to methyl, ethyl, n-propyl, i-propyl, n-butyl and n-pentyl; wherein E and G each represents a chain of alkyl substituted or unsubstituted carbon atoms completing a cycloalkenyl ring, including but not limited to monocyclic and bicyclic moieties; wherein the sum of the number of carbon atoms in $R_9$ and E (including alkyl substituents on the cycloalkenyl ring, if any) is from 8 up to 11, and the sum of the number of carbon atoms is $R_8$, $R_9$, $R_{10}$ and G (including alkyl substituents on the cycloalkenyl ring, if any) is from 8 up to 11 are described as being useful as perfume, flavor, tobacco, and flavor and fragrance modifying materials. These compounds are further described as possessing the qualities associated with (1) aromas including "seashore" or "fish-like" aromas or "green pepper", "potato" valuable citrus undertones such as "petitgrain oil-like", "coriander oil-like" or "berry fruit", "green" or "woody amber" aromas or (2) flavor notes including those useful in imparting seafood-like qualities to foodstuffs, those useful in potato such as green notes as well as those useful in spice flavors including woody notes.

Dutch published application 6914359 (assigned to H. F. and Ph. F. Reemtsma published on Apr. 1, 1970 discloses for use as tobacco flavors cyclopentapyrazine (see structure "6" compound as indicated as having a burley nuance at page 11 of published Dutch application).

Cyclohexylpicolyl ketone is shown to be produced at Vol. 56, page 10092g Chem. Abstracts [Abstract of J.Prakt.Chem. 14, 281–4 (1961)]. Cyclohexyl-2-pyridyl-methyl ketone is also shown to be produced at Volume 49, page 8959c Chem. Abstracts. Belgian Patent 668,701 sets forth the use of gamma picolyl ketones and carbinols as anti-convulsive agents. This patent is abstracted at volume 65, page 5446c of Chem. Abstracts. Cyclohexyl-2-pyridyl ketone is also disclosed at Chem. Abstracts 65, page 7136f. Cycloheptyl-4-pyridyl methyl ketone is disclosed as an anticonvulsive agent at Chem. Abstracts Volume 65, 5446e. On the other hand, cycloalkylpyrazinyl ketones have not been published or disclosed in the literature and are novel compounds claimed herein. C-3-C-8 cycloalkylpyrazinyl methane and carbinols are disclosed as fungicides by Taylor et al. in German Offenlegungschrift 1,913,726 and the synthesis of these compounds is set forth. Alkylcyclohexyl methyl pyridines, for example, 4(4-ethylcyclohexyl methyl) pyridine; 2-methyl-6-(alkylcyclohexyl methyl) pyridines; and 2,6-dimethyl-4-(3-methyl cyclohexyl methyl pyridine is disclosed in Vol. 44, page 6890d-f of Chem. Abstracts [Abstract of U.S. Pat. No. 2,505,461 issued on Apr. 25, 1950]. Cyclohexyl methyl pyridine is also disclosed in Vol. 30, page 8209(4) of Chem. Abstracts [Abstract of Chem. Ventr. 1935, II, 3897]. Cyclopentamethyl pyridines and their synthesis is disclosed at Vol. 49, page 13240c-d of Chem. Abstracts [Abstract of J. Am. Chem. Soc. 76, 5548–52 (1954)]. 3-Cyclohexylidene methyl pyridine is disclosed in Vol. 63, page 8310g of Chem. Abstracts.

Nevertheless, no disclosure exists indicating that the reference compounds yield the divert intent properties for producing (a) in fruit flavorings, green, green vegetable, green pepper, licorice, anise, sweet licorice, star anise, spicey, pear, walnut, cocoa powder, and chocolate milk tastes and green, green vegetable-like, green pepper, floral, woody, nutty, sweet green, sweet cocoa, valerian oil-like, lavandin-like, fruity and pear aromas and (b) in perfumes, green, natural green, floral, woody, jasmin-like, hyacinth-like, sweet, nicotine nuances and tobacco nuances and salicylate-like notes and (c) in tobaccos, sweet, burnt cocoa, and spicey notes.

THE INVENTION

The present invention provides novel nitrogen heterocyclic compounds having the structure:

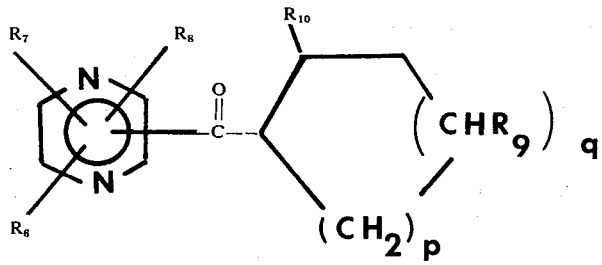

wherein $R_6$, $R_7$ and $R_8$ are the same or different and each is hydrogen or methyl; $R_9$ and $R_{10}$ are the same or different and each is hydrogen or lower alkyl; and wherein $p$ is an integer of from 2 up to 5 and $q$ is 0 or 1.

Perfume, flavor and tobacco, flavor and fragrance modifying materials containing such nitrogen heterocyclic compounds are also contemplated herein. Furthermore, perfume, flavor and tobacco materials containing other substituted pyridines and pyrazines are also contemplated herein and the scope of this invention covers the use of such pyridine and pyrazine compounds in tobacco flavoring and perfume materials wherein such compounds have the generic structure:

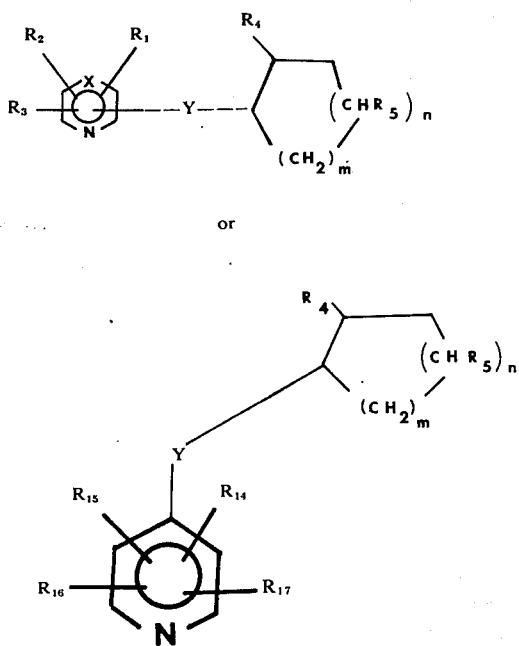

wherein $R_1$, $R_2$ and $R_3$ are the same or different and each is hydrogen or methyl; $R_4$ and $R_5$ are the same or different and each may be either hydrogen or lower alkyl; wherein $n$ is 0 or 1; wherein $m$ is an integer of from 2 up to 5; wherein X is nitrogen C–H, or C–CH$_3$; wherein $R_{14}$, $R_{15}$ and $R_{17}$ are the same or different and each represents hydrogen or methyl; and wherein Y is methylene, hydroxymethylene or carbonyl.

The present invention further relates to compositions useful in altering the organoleptic characteristics of foodstuff or tobacco. The invention also has to do with altering the fragrance of perfume materials.

The term "alter" in its various forms is used herein to mean supplying or imparting of flavor character or note to an otherwise bland, relatively tasteless substance or augmenting the existing flavor characteristic where a natural flavor is deficient in some regard or supplementing the existing flavor impression to modify its quality, character or taste. The term alter also is intended herein to mean the supplying or imparting of a fragrance character or note to an otherwise bland, relatively odorless substance or augmenting the existing fragrance characteristic where a natural fragrance is deficient in some regard or supplementing the existing fragrance impression to modify its quality, character or aroma.

The term "foodstuff" as used herein includes both solid and liquid ingestible materials which usually do, but need not, have nutritional value. Thus, foodstuffs include meats, gravies, soups, convenience foods, beverages, dairy products, candies, vegetables, cereals, soft drinks, snacks and the like.

Licorice, green, green vegetable, anise, sweet licorice, star anise, spice, pepper, walnut, cocoa powder, and chocolate milk tastes and green, green vegetable-like, green pepper, floral, woody, nutty, sweet green, sweet cocoa, valerian oil-like, lavandin-like, fruity and pear aromas for foodstuffs are very popular and a great deal of effort has been devoted to the preparation of materials which have such aromas and taste as well as to improve the spice, green vegetable, and licorice flavors of certain types of natural materials.

In the past, it was found that substitute green or green vegetable or green pepper flavoring materials lacked certain supporting qualities and characteristics found in quality green, green pepper and green vegetable materials. Further, it was found that substitute spice flavoring materials lacked certain supporting qualities characteristic of quality spice flavoring materials. It was further found that substitute licorice flavor materials lacked certain "anise" or "star anise" characteristics found in the flavor of natural licorice and products made from such materials were deficient in flavor and/or aroma. It was further found that many tobacco products, particularly after processing thereof, lacked adequate flavor. In addition, it was found that many cocoa products are devoid of the flavors required to make them natural tasting.

Accordingly, in accordance with this invention, it has been found that novel tobacco, foodstuff and flavoring compositions having green, green vegetable, green pepper, licorice, anise, sweet licorice, star anise, spicey, pear, walnut, cocoa powder and chocolate milk tastes and green, green vegetable-like, green pepper, floral, woody, nutty, sweet green, sweet cocoa, valerian oil-like, lavendin-like, fruity and pear aromas (for foodstuffs), sweet, burnt cocoa and spicey notes (for tobacco) may be provided by the utilization of at least one of the compounds set forth in this invention in which compound may or may not be novel as described hereinafter. It has been also found that novel perfume compositions having green, natural green, floral, woody, jasmin-like, hyacinth-like, sweet, nicotine nuances may be provided by at least one of the compounds set forth in our invention.

The heterocyclic nitrogenn compounds of our invention may be obtained by one of several processes as set forth hereinafter. Examples of the materials produced and their flavor, aroma and fragrance properties are set forth in the following Table I:

In addition, the following compounds produced according to the processes set forth below have specific unique and valuable tobacco flavor characteristics as follows:

| Compound Name | Tobacco Flavor Nuance |
|---|---|
| Cyclohexyl pyrazinyl ketone | Cocoa flavor |
| Cyclohexyl methyl pyrazine | Sweet, green |
| Cycloheptyl methyl pyrazine | Coumarin-like |
| 2-(cyclohexyl methyl) pyridine | Earthy, musty |
| 3-(cyclohexyl methyl) pyridine | Sweet, aromatic green woody |
| Cyclopentyl methyl pyrazine | Natural tobacco flavor note |

As stated above, the heterocyclic nitrogen compounds

| Compound Name | Organoleptic Characteristic | | |
|---|---|---|---|
| | Flavor Taste | Flavor Aroma | Fragrance |
| (2-Ethyl Cyclohexyl) methyl pyrazine | | Sweet, floral green | Green natural salicylate-like, floral |
| (4-t-butylcyclohexyl) methyl pyrazine | Green, green pepper (threshhold level about 1 ppm) | Green at 5 ppm | Greenish, cigar butt note |
| Cyclooctylmethyl pyrazine | | Green, floral, woody, nutty pyrazine | Green, floral with woody undertone |
| Cyclohexyl pyrazinyl ketone | Sweet, cocoa powder, chocolate milk; threshhold about 0.05 ppm; use level about 2 ppm | Sweet, cocoa powder-like | Sweet, floral, benzophenone-like |
| Cyclopentyl pyrazinyl ketone | Walnut-like, green, fruity (threshhold about 0.2 ppm use level about 3 ppm) | Valerian oil-like; lavandin-like, green | Green, floral, jasmin-like with nicotine nuance |
| Cyclohexylmethyl pyrazine | Licorice, anise (Use level about 10 ppm) | Sweet, green vegetable-like | Sweet, ethereal, green, hyacinth, jasmine floral |
| Cycloheptylmethyl pyrazine | Star anise | Sweet, green vegetable-like fruity notes | Natural green, fatty, good for floral |
| 4-(Cyclohexyl methyl) pyridine | Green, vegetable | Green | Green |
| 3-(cyclohexyl methyl) pyridine | Pear, green, spicy (threshhold level about 0.05 ppm; test level about 0.2 ppm) | Pear, floral | Green with jasmine nuance |
| 2-(cyclohexyl methyl) pyridine | Green vegetable, green pepper (threshhold level about 0.05 ppm; use level about 0.2 ppm) | Green, vegetable, green pepper | Sweet, green, floral |
| 2-(cyclopentyl methyl) pyridine | Green, vegetable-like, green pepper (threshhold level about 0.005 ppm; concentration or use level about 0.02 ppm | Green | Woody, green, floral |
| Cyclopentyl methyl pyrazine | Sweet, licorice (use level about 0.5 ppm) | Vegetable, green | Sweet, ethereal, green, floral | used in this invention, some of which are novel, are obtained by one of several processes involving:

1. First reacting a nitrogen compound having the structure:

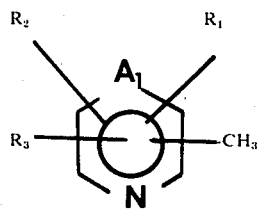

wherein $A_1$ is selected from the group consisting of:

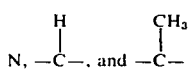

and wherein $R_1$, $R_2$ and $R_3$ are the same or different and each is methyl or hydrogen, with an alkali metal amide in liquid ammonia to form an ionic compound having the structure:

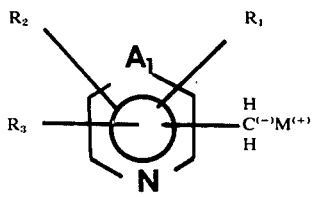

wherein M is an alkali metal cation, and then reacting the anion with a halocyclic alkane having the strucutre:

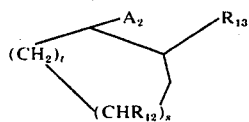

to form a nitrogen heterocyclic compound having the structure:

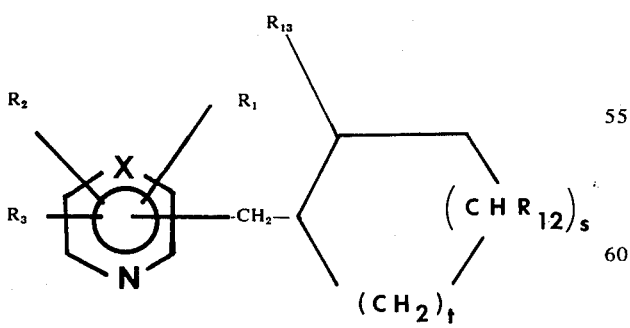

The nitrogen heterocyclic compound may be used in flavors as such or in fragrances or for tobacco flavor purposes or it may be further oxidized in the presence of an alkali metal alkoxide in a suitable solvent to form a carbinol having the structure:

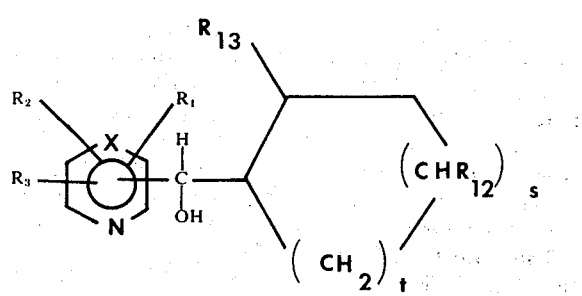

which may be utilized for its organoleptic properties or which may be further oxidized with an oxidizing agent such as manganese dioxide to form a ketone having the structure:

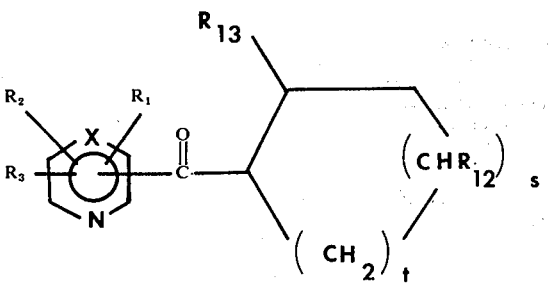

wherein $A_2$ represents halogen selected from the group consisting of iodo, bromo and chloro, x is $C—H$, $C—CH_3$ or nitrogen, $R_{12}$ and $R_{13}$ are the same or different and each is hydrogen or lower alkyl; s is 0 or 1 and t is an integer of from 2 up to 5; or 2. forming the nitrogen heterocyclic compound as in (1) and reacting it first with an N-halosuccinamide in the prsence of benzoyl peroxide to form a halo intermediate having the structure:

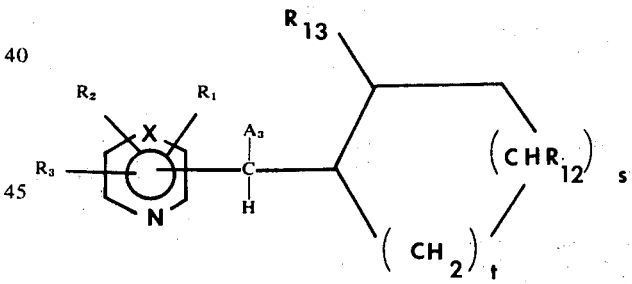

and then reacting the halo intermediate with sodium 2-nitropropane nitronate having the structure:

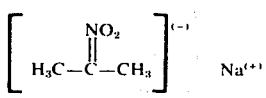

to form a ketone having the structure:

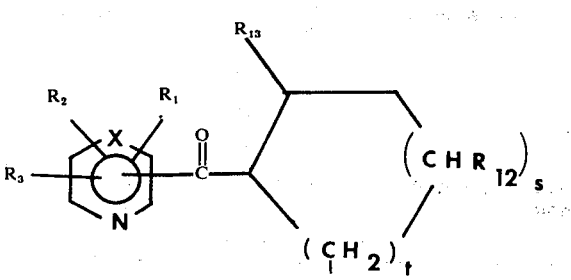

wherein $A_3$ represents halogen selected from the group consisting of bromo and chloro, X is C—H, C—CH$_3$ or nitrogen, $R_{12}$ and $R_{13}$ are the same or different and each is hydrogen or lower alkyl; s is 0 or 1 and t is an integer of from 2 up to 5 and $R_1$, $R_2$ and $R_3$ are the same or different and each represents hdyrogen or methyl; or 3. first reacting a pyridine compound having the structure:

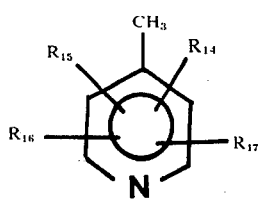

with an alkali metal amide in liquid ammonia to form the corresponding anion having the structure:

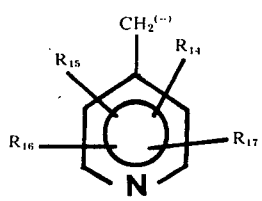

and then reacting said anion with a cycloalkyl halide having the structure:

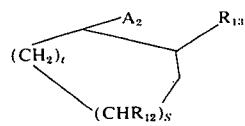

to form a nitrogen heterocyclic compound having the structure:

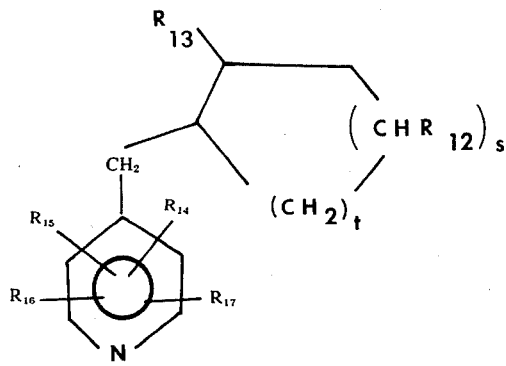

and using the nitrogen heterocyclic compound as such for its organoleptic properties in flavors, fragrances or as tobacco flavors or further oxidizing said nitrogen heterocyclic compound in the presence of an alkali metal alkoxide in a suitable solvent to form a carbinol having the structure:

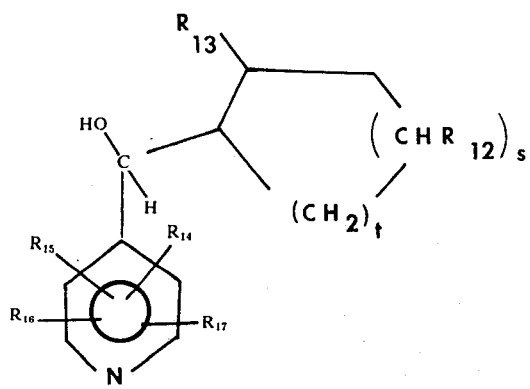

which may be used as such for its own organoleptic properties or which may then be oxidized with an oxidizing agent such as manganese dioxide to form a ketone having the structure:

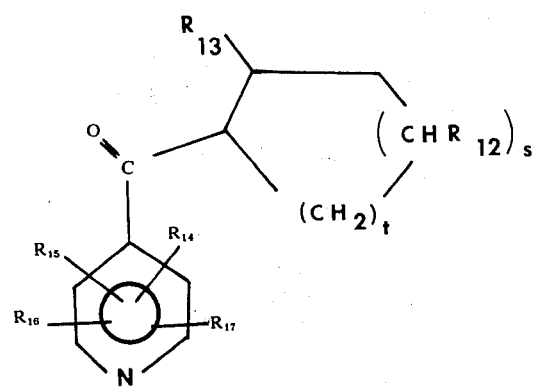

or 4. forming the nitrogen heterocyclic compound as in process (3) and then reacting the nitrogen heterocyclic compound first with an N-halosuccinamide in the presence of benzoyl peroxide to form a halo intermediate having the structure:

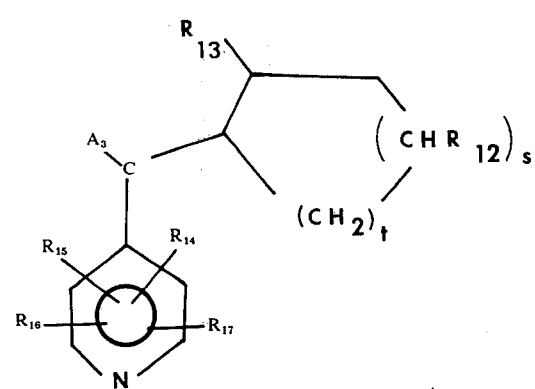

and then reacting the halo intermediate with sodium 2-nitropropane nitronate to form a ketone having the structure:

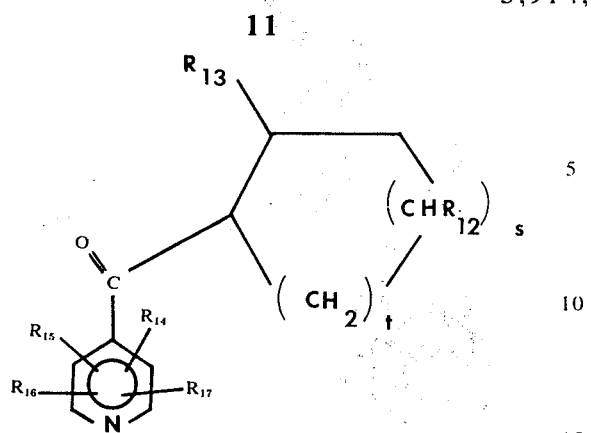

wherein $A_2$ is halogen selected from the group consisting of iodo, bromo and chloro and $A_3$ represents halogen selected from the group consisting of bromo and chloro; $R_{12}$ and $R_{13}$ are the same or different and each is hydrogen or lower alkyl; $s$ is 0 or 1 and $t$ is an integer of from 2 up to 5; and wherein $R_{14}$, $R_{15}$, $R_{16}$ and $R_{17}$ are the same or different and each represents hydrogen or methyl.

Since many of the compounds have asymetric carbon atoms, a large number of stereoisomers may exist for each individual species of compound and in view of this large number of stereoisomers which may exist all of such isomeric forms are contemplated within the scope of the invention and are included in the formulae shown.

In the first of the numbered methods of our invention an anion of a pyridine or pyrazine derivative is first formed by reacting the said pyridine or pyrazine derivative with an alkali metal amide in liquid ammonia. Examples of pyridine or pyrazine derivatives which may be so reacted to form the desired anion are as follows:

2-Methyl Pyridine
3-Methyl Pyridine
4-Methyl Pyridine
2,3-Dimethyl Pyridine
2,4-Dimethyl Pyridine
2,5-Dimethyl Pyridine
2,6-Dimethyl Pyridine
2,3,4-Trimethyl Pyridine
2,3,5-Trimethyl Pyridine
2,3,6-Trimethyl Pyridine
2,4,6-Trimethyl Pyridine
2,3,5,6-Tetramethyl Pyridine
2,3,4,6-Tetramethyl Pyridine
2,3,4,5,6-Pentamethyl Pyridine
2-Methyl Pyrazine
2,5-Dimethyl Pyrazine
2,6-Dimethyl Pyrazine
2,3-Dimethyl Pyrazine
2,3,5-Trimethyl Pyrazine
2,3,5,6-Tetramethyl Pyrazine
3,5-Dimethyl Pyridine
3,6-Dimethyl Pyridine The reaction to form the ionic compound having the structure:

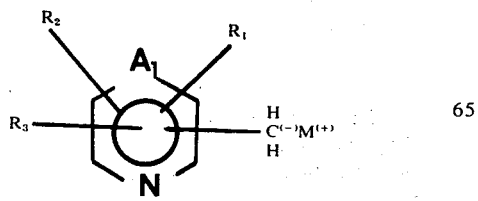

or

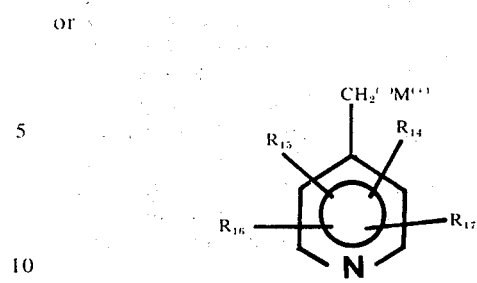

is most preferably carried out at atmospheric pressure at the boiling point of liquid ammonia. Reactions at higher temperatures up to 0°C may be performed at superatmospheric pressures. The formation of the pyridine or pyrazine anion is indicated by the formation in the reaction mass of a red or orange, red or green coloration. The anion-ammonia sodamide mixture is reacted in accordance with our invention with a cycloalkyl halide having the structure:

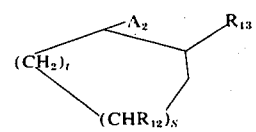

wherein $A_2$ is iodo, bromo or chloro, $R_{12}$ and $R_{13}$ are each hydrogen or lower alkyl and may be the same or different, $t$ is an integer of from 2 up to 5 and $s$ is 0 or 1. Examples of such halocyclic alkanes useful in producing the compounds of our invention are as follows:

2-Ethyl cyclopentyl bromide
Cyclopentyl bromide
2-Methyl cyclopentyl bromide
2-n-Propyl cyclopentyl bromide
2-n-Butyl cyclopentyl bromide
2-i-Butyl cyclopentyl bromide
2-t-Butyl cyclopentyl bromide
2-Ethyl Cyclohexyl bromide
Cyclohexyl bromide
2-Methyl cyclohexyl bromide
2-n-Propyl cyclohexyl bromide
2-n-Butyl cyclohexyl bromide
2-i-Butyl cyclohexyl bromide
2-t-Butyl cyclohexyl bromide
2-Ethyl cycloheptyl bromide
Cycloheptyl bromide
2-Methyl cycloheptyl bromide
2-n-Propyl cycloheptyl bromide
2-n-Butyl cycloheptyl bromide
2-i-Butyl cycloheptyl bromide
2-t-Butyl cycloheptyl bromide
2-Ethyl cyclooctyl bromide
Cyclooctyl bromide
2-Methyl cyclooctyl bromide
2-n-Propyl cyclooctyl bromide
2-n-Butyl cyclooctyl bromide
2-i-Butyl cyclooctyl bromide
2-t-Butyl cyclooctyl bromide
2-Ethyl cyclopentyl chloride Cyclopentyl chloride
2-Methyl cyclopentyl chloride
2-n-Propyl cyclopentyl chloride
2-n-Butyl cyclopentyl chloride
2-i-Butyl cyclopentyl chloride
2-t-Butyl cyclopentyl chloride
2-Ethyl cyclohexyl chloride
Cyclohexyl chloride
2-Methyl cyclohexyl chloride
2-n-Propyl cyclohexyl chloride
2-n-Butyl cyclohexyl chloride
2-i-Butyl cyclohexyl chloride
2-t-Butyl cyclohexyl chloride
2-Ethyl cycloheptyl chloride
Cycloheptyl chloride
2-Methyl cycloheptyl chloride
2-n-Propyl cycloheptyl chloride
2-n-Butyl cycloheptyl chloride
2-i-Butyl cycloheptyl chloride
2-t-Butyl cycloheptyl chloride
2-Ethyl cyclooctyl chloride
Cyclooctyl chloride
2-Methyl cyclooctyl chloride
2-n-Propyl cyclooctyl chloride
2-n-Butyl cyclooctyl chloride
2-i-Butyl cyclooctyl chloride
2-t-Butyl cyclooctyl chloride
4-Ethyl cyclopentyl bromide
4-Methyl cyclopentyl bromide
4-n-Propyl cyclopentyl bromide
4-n-Butyl cyclopentyl bromide
4-i-Butyl cyclopentyl bromide
4-t-Butyl cyclopentyl bromide
4-Ethyl cyclohexyl bromide
4-Methyl cyclohexyl bromide
4-n-Propyl cyclohexyl bromide
4-n-Butyl cyclohexyl bromide
4-i-Butyl cyclohexyl bromide
4-t-Butyl cyclohexyl bromide
4-Ethyl cycloheptyl bromide
4-Methyl cycloheptyl bromide
4-n-Propyl cycloheptyl bromide
4-n-Butyl cycloheptyl bromide
4-i-Butyl cycloheptyl bromide
4-t-Butyl cycloheptyl bromide
4-Ethyl cyclooctyl bromide
4-Methyl cyclooctyl bromide
4-n-Propyl cyclooctyl bromide
4-n-Butyl cyclooctyl bromide
4-i-Butyl cyclooctyl bromide
4-t-Butyl cyclooctyl bromide
4-Ethyl cyclopentyl chloride
4-Methyl Cyclopentyl chloride
4-n-Propyl cyclopentyl chloride
4-n-Butyl cyclopentyl chloride
4-i-Butyl cyclopentyl chloride
4-t-Butyl cyclopentyl chloride
4-Ethyl cyclohexyl chloride
4-Methyl cyclohexyl chloride
4-n-Propyl cyclohexyl chloride
4-n-Butyl cyclohexyl chloride
4-i-Butyl cyclohexyl chloride
4-t-Butyl cyclohexyl chloride
4-Ethyl cycloheptyl chloride
4-Methyl cycloheptyl chloride
4-n-Propyl cycloheptyl chloride
4-n-Butyl cycloheptyl chloride
4-i-Butyl cycloheptyl chloride
4-t-Butyl cycloheptyl chloride
4-Ethyl cyclooctyl chloride
4-Methyl cyclooctyl chloride
4-n-Propyl cyclooctyl chloride
4-n-Butyl cyclooctyl chloride
4-i-Butyl cyclooctyl chloride
4-t-Butyl cyclooctyl chloride
2,4-Dimethyl cyclopentyl bromide
2,4-Dimethyl cyclopentyl chloride
2,4-Dimethyl cyclohexyl bromide
2,4-Dimethyl cyclohexyl chloride
2,4-Dimethyl cycloheptyl bromide
2,4-Dimethyl cycloheptyl chloride
2-Ethyl-4-butyl cyclopentyl bromide
2-n-Propyl-4-n-butyl cyclohexyl chloride
2-Methyl-4-n-propyl cycloheptyl bromide
2,4-Diethyl Cyclooctyl Bromide
2,4-Diethyl Cyclooctyl Chloride
2-Ethyl cyclopentyl iodide
Cyclopentyl iodide
2-Methyl cyclopentyl iodide
2-n-Propyl cyclopentyl iodide
2-n-Butyl cyclopentyl iodide
2-i-Butyl cyclopentyl iodide
2-t-Butyl cyclopentyl iodide
2-Ethyl cyclohexyl iodide
Cyclohexyl iodide
2-Methyl cyclohexyl iodide
2-n-Propyl cyclohexyl iodide
2-n-Butyl cyclohexyl iodide
2-i-Butyl cyclohexyl iodide
2-t-Butyl cyclohexyl iodide
2-Ethyl cycloheptyl iodide
Cycloheptyl iodide
2-Methyl cycloheptyl iodide
2-n-Propyl cycloheptyl iodide
2-n-Butyl cycloheptyl iodide
2-i-Butyl cycloheptyl iodide
2-t-Butyl cycloheptyl iodide
2-Ethyl cyclooctyl iodide
Cyclooctyl iodide
2-Methyl cyclooctyl iodide
2-n-Propyl cyclooctyl iodide
2-n-Butyl cyclooctyl iodide
2-i-Butyl cyclooctyl iodide
2-t-Butyl cyclooctyl iodide The reaction between the cycloalkyl halide and the anion takes place also at the low temperature as a result of using the liquid ammonia in the reaction mass. In view of the case of reaction, the cycloalkyl halide is added dropwise to the anion and the reaction takes place substantially spontaneously. It is preferable at the end of the reaction to neutralize any excess reactants by addition of solid ammonium chloride followed by addition of a suitable solvent such as diethyl ether. The ammonia is then removed as for example by heating over a steam bath.

The resulting heterocyclic nitrogen compound having the structure:

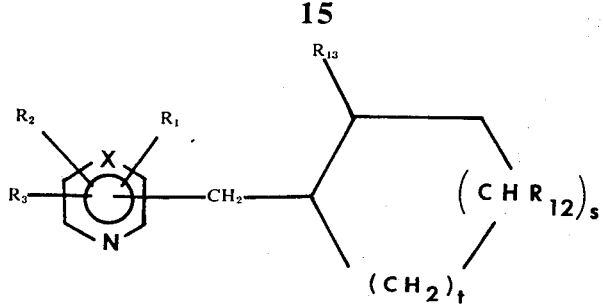

or

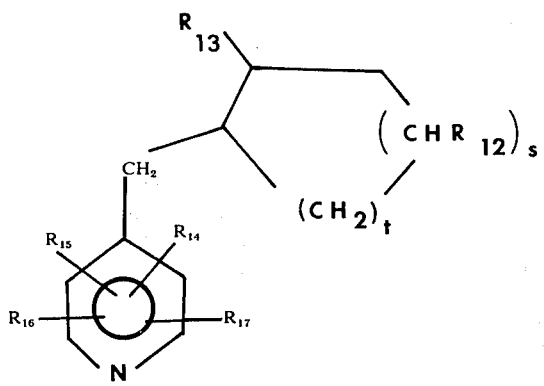

The mole ratio of cycloalkyl halide: nitrogen heterocyclic compound derivative present as the anion is preferably 1:1 since an excess of either reactant requires recovery of such excess at the end of the reaction which is considered to be uneconomical.

The heterocyclic nitrogen compound having a —$CH_2$— (methylene) bridge between the alicyclic and heterocyclic rings is used as such for its organoleptic properties or it may be further reacted to form a carbinol by means of reaction of the nitrogen heterocyclic in the presence of an alkali metal alkoxide in a suitable solvent. The reaction preferably is carried out using oxygen as an oxidizing agent. In the alternative, air is also a suitable oxidizing agent. The alkali metal alkoxide used in this reaction to form the carbinol may be for example potassium tertiary butoxide or sodium tertiary butoxide. The solvent in the reaction is preferably a mixture of t-butanol and dimethyl sulfoxide. The mole ratio of heterocyclic nitrogen compound to potassium t-butoxide is conveniently 1:1, and the concentration of the heterocyclic nitrogen compound in the solvent is preferably approximately from 0.5 up to 1.5 moles per liter. The temperature of reaction is preferably between 20°C and 50°C, with the optimum temperature having been found to be from 25°C up to 30°C. The reaction between the heterocyclic nitrogen compound and oxygen is terminated by addition of water and the resulting reaction product is extracted with a suitable solvent such as diethyl ether and dried by the standard technique, e.g., using anhydrous sodium sulfate. The workup is continued using standard distillation techniques. Thus, for example, cyclohexyl pyrazinyl carbinol is distilled at 130°–150°C at 2 mm Hg. pressure.

Examples of carbinols produced by the foregoing process step are as follows:
(2-ethyl cyclohexyl)-pyrazinyl carbinol
(4-t-butyl-cyclohexyl)-pyrazinyl carbinol
Cyclooctyl pyrazinyl carbinol
Cyclohexyl pyrazinyl carbinol
Cycloheptyl pyrazinyl carbinol
Cyclohexyl-(4-pyridyl)-carbinol
Cyclohexyl-(3-pyridyl) carbinol
Cyclohexyl-(2-pyridyl) carbinol
Cyclopentyl-(2-pyridyl) carbinol
Cyclopentyl pyrazinyl carbinol
Cyclopentyl-(3-pyridyl) carbinol The resulting carbinol may be used as such for its organoleptic properties or it may be oxidized using an oxidizing agent such as activated manganese dioxide to yield the corresponding ketone having the structure:

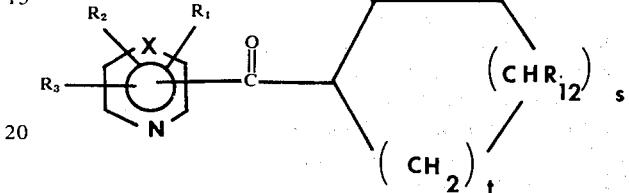

or

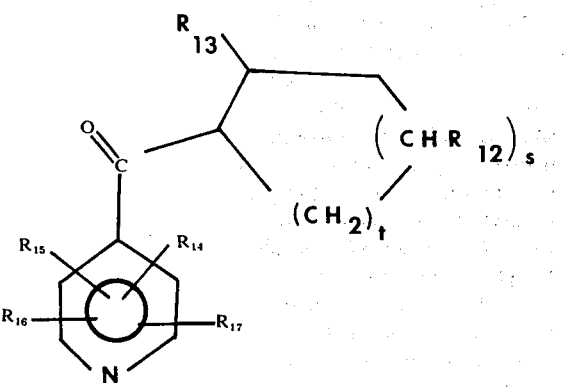

wherein $R_1$, $R_2$ and $R_3$ are the same or different and each represents hydrogen or methyl; wherein $R_{12}$ and $R_{13}$ are the same or different and each is hydrogen or lower alkyl; $s$ or 0 or 1; $t$ is an integer of from 2 up to 5; $R_{14}$, $R_{15}$, $R_{16}$ and $R_{17}$ are the same or different and each represents hydrogen or methyl and X is —CH or —C—$CH_3$ or nitrogen. Manganese dioxide is a preferred oxidizing agent and the reaction with active manganese dioxide is most preferably carried out in a solvent such as carbon tetrachloride or methylene chloride at reflux with vigorous mixing. The mole ratio of carbinol:manganese dioxide oxidizing agent is preferably 0.5:1, however, the mole ratio can vary from 0.5:1 up to 3:1. Of course, the use of an excess quantity of manganese dioxide gives rise to the necessity of filtration of a large quantity of solids at the end of the reaction where a ketone is formed. Examples of ketones formed as a result of this reaction are as follows:
Cyclohexyl pyrazinyl ketone
Cyclopentyl pyrazinyl ketone
(2-ethyl cyclohexyl) pyrazinyl ketone
(4-t-butyl cyclohexyl) pyrazinyl ketone
Cyclooctyl pyrazinyl ketone
Cyclohexyl pyrazinyl ketone
Cyclopentyl pyrazinyl ketone
(4-cyclohexyl) pyridyl ketone
(3-cyclohexyl) pyridyl ketone
(2-cyclohexyl) pyridyl ketone
(2-cyclopentyl) pyridyl ketone Cyclopentyl pyrazinyl ketone
In the alternative, the nitrogen heterocyclic compound having the structure:

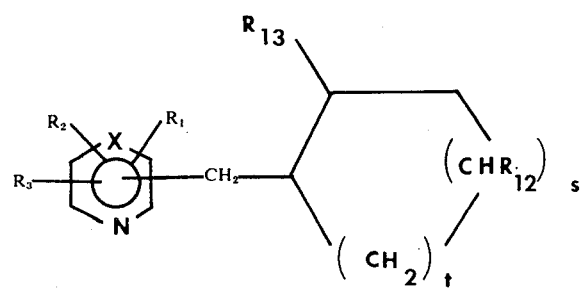

or

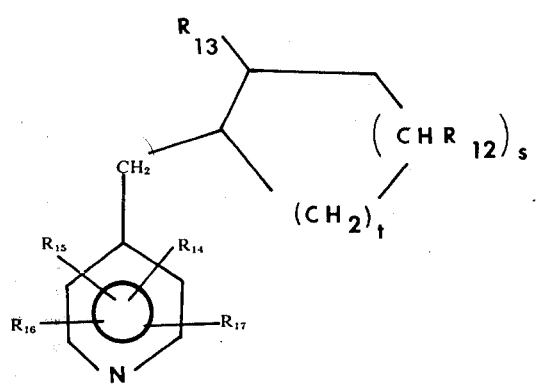

may be reacted first with an N-halosuccinamide (such as N-bromosuccinamide) in the presence of an organic peroxide such as benzoyl peroxide thereby forming a halo intermediate having the structure:

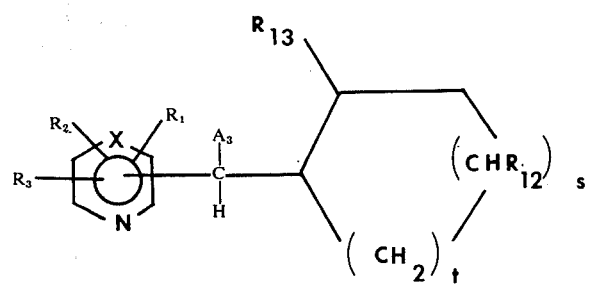

or

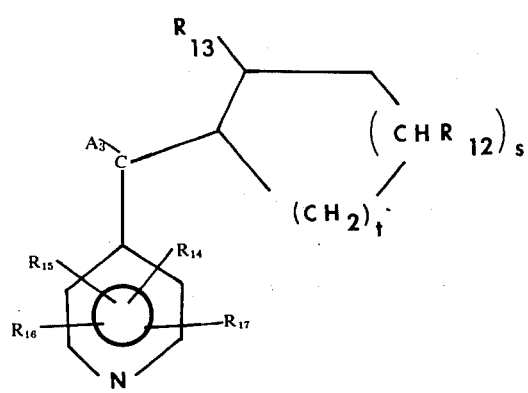

wherein $R_1$, $R_2$, $R_3$, $R_{14}$, $R_{15}$, $R_{16}$, $R_{17}$ are the same or different and each represents hydrogen or methyl; $R_{12}$ and $R_{13}$ are the same or different and each represents hydrogen or lower alkyl; $s$ is 0 or 1; $t$ is an integer of from 2 up to 5; X is —CH, —C—CH$_3$, or nitrogen; and $A_3$ represents halogen selected from the group consisting of chloro and bromo. The reaction to form this halo intermediate is preferably carried out in a solvent such as carbon tetrachloride. A mole ratio of N-halosuccinamide to heterocyclic nitrogen compound is preferably 1:1. The reaction is preferably carried out under reflux conditions for a period of from 1 hour up to 3 hours at atmospheric pressure.

The halo intermediate is then reacted with sodium 2-nitropropane nitronate which has the structure:

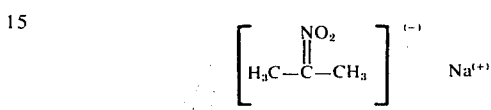

to form a ketone having the structure:

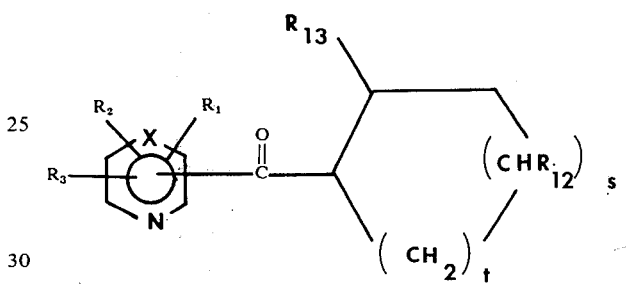

or

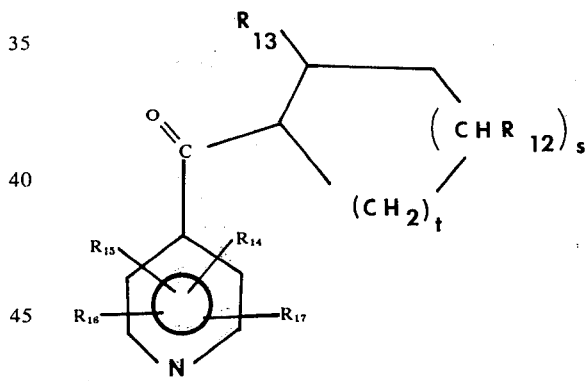

preferably in a solvent such as ethanol. The oxidation of the halo intermediate to form a ketone is preferably again carried out at reflux conditions at a temperature which depends on the boiling point of the solution at atmospheric pressure. The reaction is carried out for a period of from 1 hour up to 4 hours; preferably approximately 2 hours. At the end of the reaction, the reaction mass is worked up by first stripping the solvent and then distilling the reaction product.

The compounds of this invention having the structure:

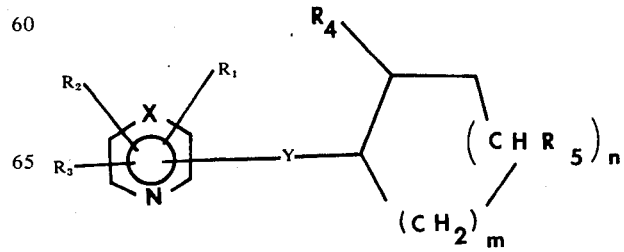

or

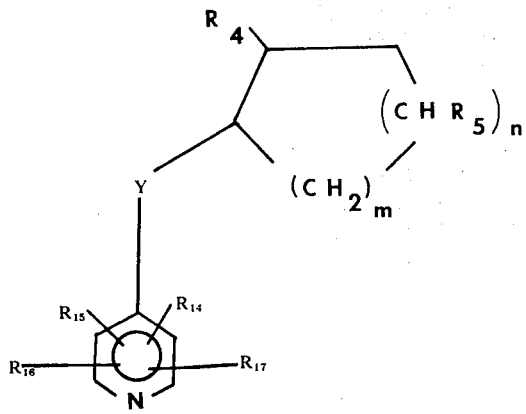

wherein Y is methylene, hydroxy methylene or carbonyl (hereinafter called "bicyclic compounds") can be added to flavor and/or perfume compositions in their pure form or they can be added to mixtures of materials in flavor and/or fragrance imparting compositions to provide a desired organoleptic or fragrance character to the finished flavor or perfume material (as the case may be). The flavor, perfume and fragrance compositions obtained according to this invention are suitable in a wide variety of foodstuffs, tobaccos and perfumed articles and can be used to improve, enhance, modify, alter or reinforce natural flavor and fragrance materials. It will thus be appreciated that the bicyclic compounds and their mixtures of this invention are useful as olfactory agents and fragrances or organoleptic agents and flavors.

The term "perfume composition" is used herein to mean a mixture of compounds, including for example, natural oils, synthetic oils, alcohols, aldehydes, ketones, esters, lactones, and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances with retard evaporation; and (d) top-notes which are usually low boiling, fresh-smelling materials.

Such perfume compositions or the novel materials of this invention can be used in conjunction with carriers, vehicles, solvents, dispersants, emulsifiers, surface-active agents, aerosol propellants, and the like. In perfume compositions, the individual components contribute their particular olfactory characteristics, but the overall effect of the perfume composition will at least be the sum of the effect of each ingredient. Thus, bucyclic compounds of this invention can be used to alter the aroma characteristics of a perfume composition, for example, by highlighting or moderating the olfactory reaction contributed by another ingredient of the composition.

The amount of one or more compounds of this invention which will be effective in perfume compositions depends on many factors, including the other ingredients, their amounts and the effects which are desired. It has been found that perfume compositions containing as little as 0.1% by weight of the compounds of this invention, or even less can be used to intensify or augment and enhance various types of fragrance compounds, the odors of which may be desired to be imparted to colognes, perfumes, bath oils and other cosmetic products. The amount employed will depend on considerations of cost, nature of the end product, the effect desired in the finished product, and the particular fragrance sought. Higher concentrations (e.g. 4% by weight) of the bicyclic compounds of this invention will intensify the "green" or "floral" notes of the compositions.

The bicyclic compounds disclosed herein can be used in a composition as an olfactory component of a fragrance which in turn can be used in perfumes, colognes, bath preparations (such as bath oils and bath salts) and the like. When the pyridines or pyrazines of this invention are used in finished perfumed articles, such as the foregoing, they can be used in amounts 0.04% or lower.

When used to impart, alter, modify or enhance flavors in foodstuffs and in tobacco, the bicyclic compounds of this invention may be employed either singly or in admixture comprising two or more thereof. In this manner, the processer is afforded means whereby to exploit the beneficial nature of each of a plurality of compounds in a specific instance.

The nature of the co-ingredients included with the bicyclic compound or compounds of this invention in formulating the product composition will, of course, depend primarily upon the ultimate use contemplated, i.e., as a foodstuff per se or tobacco flavor per se, or alternatively as a flavoring composition adapted to be added to a foodstuff or tobacco at some subsequent point of time. In any event, such compounds serve to alter the organoleptic characteristics of the ultimate foodstuffs or tobacco treated therewith.

Substances suitable for use herein as co-ingredients or flavoring adjuvants are well known in the art for such use being extensively described in the relevant literature. Apart from the requirement that any such material be "ingestibly" acceptable, and thus non-toxic or otherwise non-deleterious, nothing particularly critical resides in the selection thereof.

Accordingly, such materials, which may in general be characterized as flavoring adjuvants or vehicles comprise broadly, stabilizers, thickeners, surface active agents, conditioners, flavorants and flavor intensifiers.

Stabilizer compounds included preservatives, e.g. sodium chloride, antioxidants, e.g. calcium and sodium ascorbate, ascorbic acid, butylated hydroxyanisole (mixture of 2 and 3 tertiary butyl-4-hydroxyanisoles), butylated hydroxy toluene (2,6-di-tertiary-butyl-4-methyl phenol), propyl gallate and the like, and sequestrants, e.g. citric acid.

Thickener compounds include carriers, binders, protective colloids, suspending agents, emulsifiers and the like, e.g., agar-agar; carrageenan; cellulose derivatives such as carboxymethyl cellulose and methyl cellulose; natural and synthetic gums such as gum arabic, gum tragacanth; gelatin, proteinaceous materials, lipids; carbohydrates; starches; pectins, and emulsifiers, e.g. mono- and digycerides of fatty acids, skim milk powder, hexoses, pentoses, dissacharides e.g., sucrose, corn syrup solids and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like, starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g. carminic acid, cochineal, tumeric and curcumin and the like; firming agents such as aliminium sodium sulfate, calcium chloride and calcium gluconate; texturizers; anti-caking agents, e.g., aluminium calcium phosphate; enzymes; yeast foods, e.g., calcium lactate and calcium sulfate; nutrient supplements, e.g., iron salts such as ferric phosphate, ferric pyrophosphate, ferrous gluconate and the like, riboflavin, vitamins, zinc sources such as zinc sulfate and the like.

Flavorants and flavor intensifiers include organic acids, e.g., fatty saturated, unsaturated and amino acids; alcohols, e.g., primary and secondary alcohols; esters, carbonyl compounds including aldehydes and ketones, lactones; cyclic organic materials including benzene derivatives; alicyclics, heterocyclics such as furans, particularly 2,5-dimethyl-3-acetyfuran, alkyl pyridines, alkyl and polyalkyl pyrazines and the like, sulfur-containing materials including thiazoles, thiols, sulfides, disulfides and the like, so-called flavor potentiators such as monosodium glutamate, tetramethyl pyrazine, guanylates, inosinates, natural and synthetic flavorants such as vanillin, ethyl vanillin, diacetyl, phenethyl-2-furoate, maltol, natural gums, and the like; spices, herbs, essential oils and extractives including "bitterness principles" such as theobromine, caffein, naringin and other suitable materials creating a bitter effect.

The specific flavoring adjuvant selected for use may be either solid or liquid, depending upon the desired physical form of the ultimate product, i.e., foodstuffs, whether simulated or natural, and should, in any event, be capable of providing an environment in which the bicyclic compound(s) of our invention can be dispersed or admixed to provide a homogeneous medium. In addition, selection of one or more flavoring adjuvants as well as the quantities thereof will depend upon the precise organoleptic character desired in the finished product; thus, in the case of flavoring compositions, ingredient selection will vary in accordance with the foodstuffs to which the flavor and aroma are to be imparted. In contra-distinction in the preparation of solid products, e.g., simulated foodstuffs, ingredients capable of providing normally solid compositions should be selected such as various cellulose derivatives.

As will be appreciated by those skilled in the art the amount of bicyclic compound(s) of our invention employed in a particular instance can vary over a relatively wide range whereby to achieve desired organoleptic effects having reference to the nature of the product. All parts and percentages given herein are by weight unless otherwise specified. Thus, correspondingly greater amounts would be necessary in those instances wherein the ultimate food composition to be flavored is relatively bland to the taste, whereas relatively minor quantities may suffice for purposes of enhancing a composition merely deficient in natural flavor or aroma. Thus, the primary requirement is that the amount selected be effective, i.e., sufficient to alter the organoleptic characteristics of the parent composition, whether foodstuff per se or flavoring composition.

Thus, the use of insufficient quantities of the bicyclic compound will, of course, substantially vitiate any possibility of obtaining the desired results while excess quantities prove needlessly costly and in extreme cases, may disrupt the flavoraroma balance, thus proving self-defeating. Accordingly, the terminology "effective amount" and "sufficient amount" is to be accorded a significance in the context of the present invention consistent with the obtention of desired flavoring effects. Thus, and with respect to ultimate food compositions, it is found that quantities of bicyclic compound(s) ranging from a small but effective amount, e.g., 0.005 ppm up to about 200 ppm by weight based on total composition are suitable. Concentrations in excess of the maximum quantities stated are not normally recommended since they fail to provide commensurate enhancement or organoleptic properties. In those instances wherein the bicyclic compound(s) is (are) added to the foodstuff as (an) integral component(s) of a flavoring composition, it is, of course, essential that the total quantity of flavoring composition employed be sufficient to yield an effective bicyclic compound(s) concentration in the foodstuff product.

Flavoring compositions or tobacco prepared in accordance with the present invention preferably contain the bicyclic compound(s) in concentrations ranging from about 0.1% to 100% by weight, based on the total weight of said flavoring composition. The compositions described herein can be prepared according to conventional techniques well known in the art for such purposes. Thus, liquid products as typified by cake batters (e.g. yielding chocolate tasting cakes) can be formulated by merely admixing the involved ingredients within the proportions stated in a suitable blender to obtain the desired consistency, homogeneity of dispersion, etc. Alternatively, flavoring compositions in the form of the particulate solids can be conveniently prepared by admixing the bicyclic compound(s) with, for example, gum arabic, gum tragacanth, carrageenan and the like, and thereafter, spray drying the resultant mixture whereby to obtain the particulate solid product. Pre-prepared flavor mixes in powder form, e.g., spice mix may be obtained by mixing the dried solid components, e.g., ground parsley leaves, curry powder, "korma" and the like and the bicyclic compound(s) in a dry blender until the requisite degree of uniformity is achieved. It is presently preferred to combine with the bicyclic compound(s) of this invention the following flavoring adjuvants: vanillin, dimethyl sulfide, isobutyl acetate, isoamyl acetate, phenyl ethyl acetate, diacetyl, furfural, isoamyl alcohol, gamma butyryl lactone, acetophenone, benzaldehyde, maltol, phenyl ethyl alcohol, acetaldehyde, isobutyl aldehyde, isovaleryl aldehyde, benzyl alcohol, methyl pyrazine, 2,3-dimethyl pyrazine, 2,3,5-trimethyl pyrazine, 2,3,5,6-tetramethyl pyrazine, 2-ethyl-3,5-dimethyl pyrazine, 2-ethyl-3,6-dimethyl pyrazine, 2,3,5,6-tetraethyl pyrazine, 2-methylthiazolidine, 2-ethyl thiazolidine, 2-n-propyl thiazolidine, 2-i-butyl thiazolidine, 2-n-butyl thiazolidine, 2,4,5-trimethyl thiazole, 2-i-butyl thiazole and 2-i-propyl thiazolidine.

It is well known in the tobacco art that the domestic tobaccos which are exemplified by burley, Maryland, fluecured, bright leaf or Virginia tobaccos are low in flavor as compared with so-called oriental or aromatic tobaccos which are imported from Turkey, Greece, Bulgaria, Yugoslavia, Rhodesia and Russia. Accordingly, it has been common practice in the tobacco industry to prepare blends of domestic and oriental tobaccos in order to provide cigarettes which have desired flavor and aroma characteristics. This invention also provides a tobacco which has an enhanced flavor and aroma.

With reference to the aspect of this invention which concerns tobacco flavoring the bicyclic compound(s) of this invention are added to tobacco in amounts to provide generally a tobacco in which is dispersed about 0.00005 to about 0.3 percent by weight of the additive. Preferably, the amount of additive is between about 0.0003 and about 0.02 percent by weight in order to provide tobacco having a desired flavor and aroma. The preferred percentages may be somewhat less, however, if other flavorants imparting a desired aroma are also employed. The additives may be applied in any suitable manner and preferably in the form of a liquid solution or suspension by spraying, dipping or otherwise. The additives may be incorporated at any step in the treatment of tobacco but are preferably added after aging; curing and shredding and before the tobacco is formed into tobacco products such as cigarettes, cigars and the like. Likewise, it will be apparent that only a portion of the tobacco need be treated and the thus treated tobacco may be blended with other tobacco before the tobacco products are formed. In such cases, the tobacco treated may have the additives, in excess of the amounts above indicated so that when blended with other tobaccos the final product will have the percentage within the indicated range.

In accordance with an example of this invention, an aged, cured and shredded domestic burley tobacco is sprayed with a 1 percent ethyl alcohol solution of cyclohexyl pyrazinyl ketone in an amount to provide a tobacco composition containing 0.005 percent by weight of the said pyrazine on a dry basis. Thereafter the alcohol is removed by evaporation and the tobacco is manufactured into cigarettes by the usual techniques. The cigarette when treated as indicated has a desired and pleasing aroma which is detectable in the main and side smoke streams when the cigarette is smoked; this aroma is described as a sweet, spicy, aromatic note.

It will be particularly apparent that the manner in which the bicyclic compound(s) are applied to the tobacco is not particularly important since, as indicated, it may be done in the form of spraying or dipping, utilizing suitable suspensions or solutions of the additive.

Thus, water or volatile organic solvents, such as alcohol, ether, acetone, volatile hydrocarbons and the like, may be used as the carrying medium for the additive while it is being applied to the tobacco. Also, other flavor and aroma producing additives, such as those disclosed in Jones U.S. Pat. No. 2,766,145, Hall U.S. Pat. No. 3,716,543 and Schumacher U.S. Pat. No. 2,978,365 may be incorporated into the tobacco with the additives of this invention.

While this invention is useful in the manufacture of cigarette tobacco, it is also suitable for use in connection with the manufacture of pipe tobacco, cigars and other tobacco products formed from sheeted tobacco dust or fines which are well known in the art. Likewise, the additives of the invention can be incorporated with materials such as filter tip materials, seam paste, packaging materials and the like which are used along with tobacco to form a product adapted for smoking. Furthermore, the compounds can be added to certain tobacco substitutes of natural or synthetic origin and by the term "tobacco" as used throughout this specification is meant any composition intended for human consumption by smoking or otherwise, whether composed of tobacco plant parts or substitute materials or both.

The following examples serve to illustrate embodiments of the invention as it is now preferred to practice it. It will be understood that these examples are illustrative and the invention is to be considered restricted thereto only as indicated in the appended claims.

EXAMPLE I

PREPARATION OF 2-CYCLOHEXYLMETHYL PYRAZINE

A five liter flask (equipped with a mechanical stirrer, an additional funnel and dryice trap) is charged with 2 liters of liquid ammonia. 88 Grams (2.2 moles) of sodamide is added and stirred for 5 minutes. To this, 188 gm. (2 moles) of 2-methyl pyrazine is added dropwise over a 15 minute period. A blood-red coloration is developed and the stirring is continued for an additional half hour. Then, 327.2 gm. (2 moles) of cyclohexyl bromide is added dropwise in 30 minutes. The reaction mass is stirred for 1.5 hours. The reaction is terminated by the addition of solid ammonium chloride (118 gm.) slowly followed by the addition of 1.5 liters of ether. Ammonia is then removed by heating over a steam bath and the residue is cooled. The ether layer is decanted and ether is stripped off using a Buchi evaporation apparatus. The residue (330 gm.) is mixed with Primol (50 gm.) and distilled under reduced pressure. 2-Cyclohexyl methyl pyrazine (210 gm.) is distilled at 99°–110°C/2 mm. Hg as a light yellow product. (60% conversion) The structure of the compound is confirmed by mass spectrometry: m/e 94, 41, 39, 55, 95, 53 and 176.

EXAMPLE II

PREPARATION OF PYRAZINYL CYCLOHEXYL KETONE

Step I: Preparation of Hydroxy Intermediate pyrazine
Oxygen is bubbled through a mixture of cyclohexyl methyl pyrazinen (0.4 moles; 70.4 gm.), 240 gm. of dimethyl sulfoxide (dry), 48 gm. of t-butanol and potassium-t-butoxide (44.8 gm.) taken in a one liter flask for a period of 4 hours. The temperature is maintained between 25°–30°C. The reaction is terminated by the addition of 600 ml. water. The reaction mass is then extracted with 4 200 ml. portions of ether, dried over anhydrous sodium sulfate, and filtered. The ether is stripped off by means of a Buchi evaporator. The residue (60 gm.) is distilled under reduced pressure. 14.5 Grams of 78% pure product is distilled over at 130°–150°C/2 mm. Hg as a thick syrupy liquid. (Yield 14.4%).

Step II: Oxidation to Form the Ketone
9.6 Grams (0.05 mole) of the hydroxy compound and activated manganese dioxide (9.6 gm. initially, and 30 more grams later on) is stirred and heated under reflux for 2 hours or until GLC analysis shows no hydroxy compound peak. The reaction is terminated by cooling the flask and filtering off the oxidant. The solvent is stripped off, the residue is mixed with Primol and distilled under reduced pressure. 5.4 Grams of the material is distilled as a solid between 95°–120°C-95% pure (by GLC). Further purification is carried out by recrystallization in hexane to yield a product (58%). Melting point 57°–58°C. The structure of the compound is confirmed by mass spectrometry: m/e 80, 55, 41, 52, 190, and 89.

EXAMPLE III

PREPARATION OF CYCLOPENTYL METHYL PYRAZINE

A 2 liter three-necked flask is charged with 1 liter of liquid ammonia. The flask is equipped with a Dryice condenser, mechanical stirrer, dropping funnel and 30 gm. of sodamide is added and the mass is stirred for 5 minutes. The 9.4 gm. of 2-methyl pyrazine is added and the mass is stirred for 3 minutes. A blood-red anion complex is formed.

Cyclopentyl bromide (74.5 gm.) is added over a 2 minute period and the mass is stirred for 1.5 hours. The reaction is terminated by adding 75 gm. of solid ammonium chloride. The Dry ice condenser is then replaced by a water-cooled condenser. 300 ml. of ether is then added and the reaction is heated using a steam bath for 1 hour to remove all the ammonia. As soon as the ether commences to reflux, heating is stopped.

The mixture is then added 200 gm. of ice, acidified to a pH 2 and then extracted with five 125 ml. portions of diethyl ether. The aqueous residue is rendered basic using 50% NaOH and then extracted with four 125 ml. portions of diethyl ether. The ether extracts are combined and washed with two 100 ml. portions of saturated NaCl solution. The ether layer is then dried over anhydrous $Na_2SO_4$ and the solvent is stripped using a Buchi evaporation apparatus. The residue is then distilled yielding the following fractions:

| Fraction | Temperature/Pressure | Quantity of Fraction |
| --- | --- | --- |
| No. 1 | 55–60°C/50 mm. Hg. | 7.0 gm. |
| No. 2 | 61–66°C/50 mm. Hg. | 10.5 gm. |
| No. 3 | 141°C/45 mm. Hg. | 20.4 gm. |
| No. 4 | 141°C/46 mm. Hg. | 34.0 gm. |
| No. 5 | 132°C/30 mm. Hg. | 8.4 gm. |
| No. 6 | 155°C/7 mm. Hg. | 2.0 gm. |

The structure of the compound is confirmed by mass spectrometry m/e: 94, 41, 39, 95 and 27.

EXAMPLE IV

PREPARATION OF CYCLOHEXYL METHYL PYRAZINE

A 2 liter three necked flask is charged with 1 liter of liquid ammonia. The flask is equipped with a Dry ice condenser, mechanical stirrer, dropping funnel and 39 gm. of sodamide is added and the mass is stirred for 5 minutes. The 94 gm. of 2-methyl pyrazine is added and the mass is stirred for 3 minutes. A blood-red anion complex is formed.

Cyclohexyl bromide (81.5 gm.) is added over a 2 minute period, and the mass is stirred for 1.5 hours. The reaction is terminated by adding 75 gm. of solid ammonium chloride. The Dry ice condenser is then replaced by a water-cooled condenser. 300 ml. of ether is then added and the reaction is heated using a steam bath for 1 hour to remove all the ammonia. As soon as the ether commences to reflux, heating is stopped.

The mixture is then added onto 200 gm. of ice, acidified to a pH of 2 and then extracted with five 125 ml portions of diethyl ether. The aqueous residue is rendered basic using 50% NaOH and then extracted with four 125 ml portions of diethyl ether. The ether extracts are combined and washed with two 100 ml portions of saturated NaCl solution. The ether layer is then dried over anhydrous $Na_2SO_4$ and the solvent is stripped using a Buchi evaporation apparatus. The residue is then distilled yielding the following fractions:

| Fraction | Temperature/Pressure | Quantity of Fraction |
| --- | --- | --- |
| No. 1 | 33°C/9 mm. Hg. | 7.1 gm. |
| No. 2 | 111–115°C/9 mm. Hg. | 4.1 gm. |
| No. 3 | 115–120°C/9 mm. Hg. | 14.8 gm. |
| No. 4 | 118°C/7 mm. Hg. | 33.8 gm. |
| No. 5 | 115°C/7 mm. Hg. | 1.5 gm. |

The structure of the compound is confirmed by mass spectrometry m/e: 94, 41, 39, 55, 95, 53 and 176.

EXAMPLE V

PREPARATION OF CYCLOHEPTYL METHYL PYRAZINE

A 2 liter three necked flask is charged with 600 ml. of liquid ammonia. The flask is equipped with a Dry ice condenser, mechanical stirrer, dropping funnel and 22.4 gm. of sodamide is added and the mass is stirred for 5 minutes. The 52.6 gm. of 2-methyl pyrazine is added and the mass is stirred for 3 minutes. A blood-red anion complex is formed.

Cycloheptyl bromide (50 gm.) is added over a 2 minute period, and the mass is stirred for 1.5 hours. The reaction is terminated by adding 75 gm. of solid ammonium chloride. The Dry ice condenser is then replaced by a water-cooled condenser. 300 ml. of ether is then added and the reaction is heated using a steam bath for 1 hour to remove all the ammonia. As soon as the ether commences to reflux, heating is dropped.

The mixture is then added to 200 gm. of ice, acidified to a pH of 2 and then extracted with five 125 ml. portions of diethyl ether. The aqueous residue is rendered basic using 50% NaOH and then extracted with four 125 ml. portions of diethyl ether. The ether extracts are combined and washed with two 100 ml. portions of saturated NaCl solution. The ether layer is then dried over anhydrous $Na_2SO_4$ and the solvent is stripped using a Buchi evaporation apparatus. The residue is then distilled yielding the following fractions:

| Fraction | Temperature/Pressure | Quantity of Fraction |
| --- | --- | --- |
| No. 1 | 34–40°C/10 mm. Hg. | 6.5 gm. |
| No. 2 | 70–131°C/9 mm. Hg. | 1.6 gm. |
| No. 3 | 131–134°C/7 mm. Hg. | 40.75 gm. |

The structure of the compound is confirmed by mass spectrometry m/e: 94, 41, 55, 39, 95, 53 and 190.

EXAMPLE VI

PREPARATION OF (4-T-BUTYL) CYCLOHEXYL PYRAZINYL METHANE

Step I: Preparation of the Bromide

A 250 ml. flask equipped with stirrer, condenser, thermometer, and an addition funnel is charged with 17.7 gm. para-t-butyl cyclohexanol and 50 ml. of benzene and stirred well. Then it is warmed to 30°–35°C and 12 gm. $PBr_3$ is added dropwise in 15 minutes and the temperature is not allowed to rise above 45°C. The reaction mass is stirred for 90 minutes between 55°–60°C. The mass is then cooled, and the cooled solution is added to a beaker containing 150 ml. ice cold water with stirring. The benzene layer is allowed to separate and the separated aqueous layer is extracted with two 100 ml. portions of diethyl ether and the organic phases are combined and washed, first with 100 ml. saturated NaCl, then with 100 ml. saturated $NaHCO_3$ and finally with another 100 ml. saturated NaCl. The organic phase is then dried over anhydrous $Na_2SO_4$ and filtered. The ether is removed by evaporation and the resulting residue (19 gm.) is used as such for Step II.

Step II:

A 1 liter flask equipped with mechanical stirrer, condenser (Dry ice) and thermometer is charged with 200 ml. of liquid ammonia. 3.2 Grams of sodamide is then added to the liquid ammonnia and the mixture is stirred for a period of 15 minutes to the resulting mixture, 17.0 gm. of product prepared according to Step I is added over a 15 minute period. The reaction mass is stirred for 30 minutes and at that point the reaction is terminated by addition of 5 gm. of solid ammonium chloride. 200 ml. of diethyl ether is then added and the liquid ammonia is stripped off by heating the reaction mass using a steam bath. The mixture is then transferred to 200 gm. of ice, acidified to a pH of 2 and extracted with five 125 ml. portions of diethyl ether. The aqueous residue is rendered basic using 50% sodium hydroxide and then extracted with four 125 ml. portions of diethyl ether. The ether extracts are combined and washed with two 100 ml. portions of saturated sodium chloride solution. The ether layer is then dried over anhydrous sodium sulfate and the solvent is stripped off using a Buchi evaporation apparatus. The residue is then distilled yielding the following fractions:

| Fraction | Temperature/Pressure | Quantity of Fraction |
|---|---|---|
| No. 1 | 115–121°C/3 mm. Hg. | 0.5 gm. |
| No. 2 | 121–123°C/3 mm. Hg. | 0.9 gm. |
| No. 3 | 121–140°C/3 mm. Hg. | 4.0 gm. |
| No. 4 | 140–145°C/3 mm. Hg. | 0.5 gm. |

Fractions 2 and 3 are combined and as a result of GLC, mass spectral and nmr analysis is found to contain substantially pyrazinyl (4-t-butyl) cyclohexyl methane. Mass spectral data is as follows: m/e 94, 95, 41, 57, 55, 81 and 232.

EXAMPLE VII

PREPARATION OF 2-(2-ETHYL CYCLOHEXYL) METHYL PYRAZINE

A 2 liter reaction flask equipped with a mechanical stirrer, a low temperature thermometer, a dropping funnel and a Dry ice condenser is charged with 400 ml. of liquid ammonia. 10.68 Grams of sodamide is added and the resulting mixture is stirred for a period of 15 minutes. 25.6 Grams of methyl pyrazine is then added over a 10 minute period. A blood-red coloration is formed indicating pyrazine anion formation. Stirring is carried out for an additional 30 minutes in order to complete the reaction.

25 Grams of 2-ethyl cyclohexyl bromide is added dropwise over a 30 minute period and the reaction mass is stirred for an additional 1.5 hours. The reaction is then terminated by adding to the reaction mass 25 gm. of solid ammonium chloride. Then 400 ml. of diethyl ether is added and the Dry ice condenser is replaced by a standard water condenser. The reaction flask is then warmed over a steam bath causing all of the ammonia to evaporate. At this point, until the diethyl ether commences to reflux, and the heating is stopped, the reaction mass is transferred to a beaker containing 200 gm. of ice. The reaction mass is made acidic by the addition of concentrated acid. The acidified reaction mass is extracted with five 200 ml. portions of diethyl ether, and the ether extracts are combined and dried anhydrous sodium sulfate. The ether is then stripped using a Buchi evaporator and 5 gm. of Primol is added to the residue. The residue is then distilled at reduced pressure yielding the following fractions:

| Fraction | Temperature/Pressure | Quantity of Fraction |
|---|---|---|
| No. 1 | 30–100°C/20 mm. Hg. | 5.6 gm. |
| No. 2 | 176–179°C/21 mm. Hg. | 21.2 gm. |

Fraction 2 is shown by GLC, mass spectral, nmr and IR analyses to be 2-(2-ethyl cyclohexyl) methyl pyrazine. Mass spectral data is as follows: m/e 94, 41, 107, 55, 95 and 204.

EXAMPLE VIII

PREPARATION OF CYCLOHEXYL PYRAZINYL KETONE VIA CYCLOHEXYL PYRAZINYL BROMIDE

A 2 liter light bottom flask equipped with stirrer, condenser and thermometer is charged with the following materials:
1. Cyclohexyl methyl pyrazine produced according to Example IV - 26.4 gm.
2. N-bromosuccinamide - 27.6 gm.
3. Carbon-tetrachloride - 400 ml.
4. Benzoyl peroxide - 0.6 gm.

This mixture is refluxed and during refluxing operation, a vigorous reaction takes place wherein bromine is evolved. After a period of 1.5 hours of refluxing, the reaction mass is cooled, filtered and the solvent is stripped off. The resulting residue is added to a flask containing sodium 2-nitropropane nitronate (previously made by first reacting 3.45 gm. of sodium with 200 ml. ethanol and then mixing therewith 13.95 gm. of 2-nitropropane). The resulting reaction mass is then refluxed for a period of 1 hour, cooled and filtered. The ethanol solvent is then stripped off and the residue is dissolved in 250 ml. diethyl ether, extracted as two 50 ml. portions of 10% sodium hydroxide and then with 50 ml. of water. The ether solution is then dried anhydrous sodium sulfate, filtered and stripped of solvent. The resulting residue is mixed with 20 gm. of Primol and then distilled yielding two fractions:

| Fraction | Temperature/Pressure | Quantity of Fraction |
|---|---|---|
| No. 1 | 30–100°C/20 mm. Hg. | 5.6 gm. |
| No. 2 | 176–179°C/21 mm. Hg. | 21.2 gm. |

Fraction 2 is found to contain some cyclohexyl pyrazinyl ketone confirmed by GLC, mass spectral, NMR and IR analyses. Mass spectral analysis is as follows: m/e = 80, 55, 41, 52, 190, and 39.

EXAMPLE IX

PREPARATION OF CYCLOHEXYL PYRAZINYL CARBINOL

Into a 1 liter flask equipped with stirrer, oxygen inlet tube, the drying tube and thermometer, the following materials are charged:

1. Cyclohexyl methyl pyrazine - 70.4 gm.
2. Dimethyl sulfoxide - 2.40 gm.
3. t-Butanol - 48 gm.
4. Potassium-t-butoxide - 44.8 gm.

Over a period of 4 hours, oxygen is bubbled into the reaction mass while maintaining the reaction mass at the temperature between 2°C and 30°C. 600 ml. of water is then added to terminate the reaction. The reaction mass is then extracted with four 200 ml. portions of diethyl ether. The ether extracts are combined and dried over anhydrous sodium sulfate and filtered. Solvent is then stripped, leaving 60 gm. residue. The residue is mixed with 40 gm. of Primol and distilled on a semimicro distillation apparatus yielding four fractions:

| Fraction | Temperature/ Pressure | Quantity of Fraction |
| --- | --- | --- |
| No. 1 | 90–110°C/2 mm. Hg. | 24.1 gm. |
| No. 2 | 110–120°C/2 mm. Hg. | 15.6 gm. |
| No. 3 | 120–130°C/2 mm. Hg. | 2.4 gm. |
| No. 4 | 130–150°C/2 mm. Hg. | 14.5 gm. |

Fraction 4 contains 78% cyclohexyl pyrazinyl carbinol confirmed by GLC, mass spectral, NMR and IR analyses. Mass spectral analysis yield the following data: m/e = 110, 55, 41, 109, and 27.

EXAMPLE X

PREPARATION OF CYCLOHEXYL PYRAZINYL KETONE

Into a 250 ml. reaction flask equipped with stirrer, thermometer and reflux condenser, the following materials are placed:

1. Pyrazinyl cyclohexyl carbinol produced according to Example IX - 9.6 gm.
2. Manganese dioxide - 9.96 gm. (0.005 moles.)
3. Methylene chloride - 100 ml.

The reaction mass is stirred for a period of 1 hour while refluxing. At the end of this period, a GLC analysis indicated only 15% conversion. The additional amount of manganese dioxide 30 gm. is added to the reaction mass and refluxing is continued for 1 additional hour. At this point, according to GLC analysis, conversion is completed. The reaction mass is cooled, filtered and the solvent is removed therefrom by evaporation. The resulting residue is mixed as Primol and distilled using semimicro distillation apparatus. The distillation yields four fractions as follows:

| Fraction | Temperature/Pressure | Quantity of Fraction |
| --- | --- | --- |
| No. 1 | 95–100°C/3 mm. Hg. | 1.0 gm. |
| No. 2 | 100–110°C/3 mm. Hg. | 1.5 gm. |
| No. 3 | 110–115°C/3 mm. Hg. | 2.5 gm. |
| No. 4 | 111–120°C/2 mm. Hg. | 0.4 gm. |

Fractions 3 and 4 are combined and crystallized from n-hexane yielding 0.4 gm. of 99.6% pure cyclohexyl pyrazinyl ketone. The structure is confirmed by GLC, mass spectral, NMR and IR analyses. The melting point of this product is 57°–58°C. Mass spectral analysis is as follows: m/e = 80, 55, 41, 52, 190, and 39.

EXAMPLE XI

PREPARATION OF PYRAZINYL CYCLOPENTYL KETONE

Into a two liter round bottom flask equipped with stirrer, thermometer and condenser, the following materials are charged:

1. Carbon-tetrachloride - 300 ml.
2. Cyclopentyl methyl pyrazine - 24.3 gm. (0.15 moles)
3. N-Bromosuccinamide - 26.7 gm.
4. Benzoyl Peroxide - 0.5 gm.

The reaction mass is heated to reflux at atmospheric pressure. The refluxing is carried out for 1.5 hours. The reaction mass is then cooled and filtered. The solvent is stripped using a Buchi evaporator and the mixture is added to the sodium salt of 2-nitropropane nitronate (prepared by adding 3.45 gm. sodium metal to 0.15 moles of nitropropane in 200 ml. ethanol). The reaction mass is then refluxed for 2 hours, cooled and filtered. The solvent is stripped off and the residue is then dissolved in diethyl ether. The ether solution is then extracted with two 50 ml. portions of 1 M sodium hydroxide and then 50 ml. of saturated sodium chloride solution. The resulting solution is then dried over anhydrous sodium sulfate and the solvent is stripped using a Buchi evaporator. The resulting residue is then mixed with 20 gm. of Primol and distilled at reduced pressure yielding the following fractions:

| Fraction | Temperature/Pressure | Quantity of Fraction |
| --- | --- | --- |
| No. 1 | 99–115°C/9 mm. Hg. | 3 gm. |
| No. 2 | 115–135°C/9 mm. Hg. | 2.3 gm. |
| No. 3 | 135–145°C/9 mm. Hg. | 5.6 gm. |
| No. 4 | 145°C/9 mm. Hg. | 1.5 gm. |

GLC, mass spectral and NMR analyses yield the information that fraction 3 contains primarily pyrazinyl cyclopentyl ketone. Mass spectral analysis is as follows: m/e = 41, 80, 69, 52, 39, 148 and 176.

EXAMPLE XII

PREPARATION OF PYRAZINYL CYCLOPENTYL CARBINOL

Into a 500 ml. flask equipped with mechanical stirrer, thermometer, condenser, and cooling bath, the following materials are added:

| Dimethyl Sulfoxide | 300 gm. |
| --- | --- |
| t-Butanol | 60 gm. |

The mixture is cooled to 15°C and to the mixture 56.1 gm. of potassium t-butoxide, followed by 81 gm. of cyclopentyl methyl pyrazine are added. Air is bubbled into the reaction mass vigorously. Three hours of stirring at 15°C do not show very much product (using GLC analysis). The cooling bath is removed and the reaction mass changes to a deep red. The reaction mass is stirred for 1.5 hours at the end of which period 400 ml. water is added using a cooling bath. The reaction mass is then extracted with five 200 ml. portions of diethyl ether. The ether extracts are combined and then extracted with two 150 ml. portions of saturated sodium chloride solution. The combined ether extracts are then dried over anhydrous sodium sulfate. The dried extracts are then filtered and stripped of solvent on a Buchi evaporator. The resulting residue is then mixed with 30 gm. Primol and distilled using semi-micro distillation apparatus yielding two fractions:

| Fraction | Temperature/Pressure | Quantity of Fraction |
|---|---|---|
| No. 1 | 95–110°C/2 mm. Hg. | 48.3 gm. |
| No. 2 | 120–130°C/2 mm. Hg. | 16.5 gm. |

Fraction 2 contains 71% cyclopentyl pyrazinyl carbinol as confirmed by NMR, mass spectral and infrared analyses. The mass spectral analysis is as follows: m/e = 110, 109, 41, 39, 27, 53 and 178.

EXAMPLE XIII

PREPARATION OF PYRAZINYL CYCLOPENTYL KETONE (EX CARBINOL)

Into a 250 ml. Erlenmeyer flask equipped with thermometer, stirrer and reflux condenser, the following materials are added:

| | |
|---|---|
| Cyclopentyl pyrazinyl carbinol produced according to Example XII | 8 gm. |
| Methylene chloride | 50 ml. |
| Manganese dioxide | 9 gm. |

The reaction mass is stirred for 15 minutes, however, GLC analysis shows very little product. The reaction mass is then refluxed for a period of 1 hour. GLC shows some product. Over the next 4 minutes, an additional 30 gm. of manganese dioxide is added and the reaction mass is refluxed for a period of 1 hour. GLC analysis indicated 40% conversion at this point. The reaction mass is then filtered and 30 gm. of fresh activated manganese dioxide is added. The reaction mass is then refluxed for 1 hour and at that point, GLC analysis yields the information that 50% conversion has taken place. The reaction mass is cooled and the solvent is stripped off. The residue is then mixed with 20 gm. of Primol and distillation is carried out under reduced pressure yielding the following fractions:

| Fraction | Temperature/Pressure | Quantity of Fraction |
|---|---|---|
| No. 1 | 100–110°C/2 mm. Hg. | 1.8 gm. |
| No. 2 | 110–118°C/2 mm. Hg. | 2.7 gm. |
| No. 3 | 118–120°C/2 mm. Hg. | 0.5 gm. |
| No. 4 | 120–127°C/2 mm. Hg. | 0.7 gm. |

GLC, NMR, mass spectral and IR analyses indicates that fraction 1 contains 71% pyrazinyl cyclopentyl ketone. Mass spectral data is as follows: m/e = 41, 80, 69, 52, 39, 148 and 176.

EXAMPLE XIV

PREPARATION OF 2-(CYCLOPENTYL METHYL) PYRIDINE

Into a 500 ml. three neck flask equipped with stirrer, Dry ice condenser and addition funnel, the following ingredients are added:

| | |
|---|---|
| Liquid Ammonia | 100 ml. |
| Sodamide | 4.4 gm. |

The sodamide-liquid ammonia mixture is stirred for a period of five minutes after which 9.3 gm. of 2-picoline is added over a period of 5 minutes. The reaction mass is colored orange-red at this point indicating the presence of the 2-picoline anion. To the reaction mass, 14.9 gm. of cyclopentyl bromide diluted with an equal volume of diethyl ether is added dropwise over a period of 10 minutes. The color of the reaction mass has now changed to green. The reaction mass is stirred for a period of 15 minutes and at that point the reaction is terminated by the addition thereto of 6 gm. of solid ammonium chloride. At this point, 100 ml. of diethyl ether is added and the ammonia is removed by means of application to the reaction vessel of a steam bath. The reaction mass now exists in two phases; a "solvent" phase and a "solid" phase. The ether layer is decanted and the solid phase is mixed with two 100 ml. portions of diethyl ether. The ether extracts are combined and dried over anhydrous sodium sulfate and then filtered. The ether is stripped using a Buchi evaporator. The resulting residue weighing 18.5 gm. is combined with 20 gm. of Primol and distilled using semi-micro distillation apparatus under reduced pressure yielding three fractions:

| Fraction | Temperature/Pressure | Quantity of Fraction |
|---|---|---|
| No. 1 | 30–68°C/2 mm. Hg. | 7.9 gm. |
| No. 2 | 80–90°C/2 mm. Hg. | 6.9 gm. |
| No. 3 | 90–110°C/2 mm. Hg. | 0.3 gm. |

Fraction 2 is shown by GLC, NMR and IR analyses to be 2-(cyclopentyl methyl) pyridine. Mass spectral data is as follows: m/e = 93, 39, 41, 27, 94, 132 and 161.

EXAMPLE XV

PREPARATION OF 2-(CYCLOHEXYL METHYL) PYRIDINE

Into a two liter flask equipped with a stirrer, addition funnel, low temperature thermometer and Dry ice condenser, the following materials are placed:

| | |
|---|---|
| Liquid Ammonia | 1 liter |
| Sodium Amide | 44 gm. (1.1 mole) |

The ammonia-sodamide mixture is stirred for 5 minutes and then 93 gm. (1 mole) of 2-methyl pyridine is added dropwise thereby preparing a 2-methyl pyridine anion. The color of the reaction mass at this point is orange-red. The reaction mass is stirred for a period of 15 minutes and then 163.06 gm. (1 mole) of cyclohexyl bromide diluted with an equal volume of diethyl ether is added over a 20 minute period. At this point, the reaction mass is stirred for a period of 1 hour and then the reaction is terminated by the addition of 54 gm. of solid ammonium chloride. 100 ml. of diethyl ether is then added to the reaction mass and the excess ammonia is removed by means of a steam bath. The reaction mass now exists in two phases; a "ether" phase and a "solid" phase. The ether layer is decanted and the resulting solid layer is washed with three 200 ml. portions of diethyl ether. The ether washings are combined and dried over anhydrous sodium sulfate and the mixture is then filtered and stripped of solvent using a Buchi evaporator. The resulting 188 gm. of residue is then mixed with 50gm. of Primol and distilled yielding the following fractions:

| Fraction | Temperature/Pressure | Quantity of Fraction |
|---|---|---|
| No. 1 | 40–55°C/2 mm. Hg. | 78.2 gm. |
| No. 2 | 95–110°C/2 mm. Hg. | 23.0 gm. |
| No. 3 | 110–123°C/2 mm. Hg. | 19.9 gm. |
| No. 4 | 121°C/2 mm. Hg. | 34.8 gm. |
| No. 5 | 123°C/2 mm. Hg. | 1.0 gm. |

Fraction 4 contains substantially all 2-(cyclohexyl) methyl pyridine as confirmed by mass spectral and NMR analyses. Mass spectral data is as follows: m/e = 93, 39, 41, 27, 94, 65, and 175.

EXAMPLE XVI

PREPARATION OF 3-(CYCLOHEXYL METHYL) PYRIDINE

Into a two liter flask equipped with a stirrer, addition funnel and Dry ice condenser, the following materials are added:

| Liquid Ammonia | 500 ml. |
|---|---|
| Sodamide | 22 gm. |

The ammonia-sodamide mixture is stirred for a period of 5 minutes after which 46.5 gm. (0.5 moles) of 3-methyl pyridine is added over a 10 minute period. At this point, the reaction mass is dark red in color indicating the presence of 3-methyl pyridine anion. After stirring the reaction mass for a period of 15 minutes, 81.5 gm. cyclohexyl bromide is added with an equal volume of diethyl ether over a 15 minute period. The reaction mass is then stirred for 1 hour after which period of time the reaction is terminated by means of addition thereto of 30 gm. of solid ammonium chloride. The ammonia is then removed by using a steam bath after one liter of diethyl ether is added. The ether layer is decanted and the residue solid is washed with three 200 ml. portions of diethyl ether. The ether portions are then combined and dried over anhydrous sodium sulfate. The mixture is then filtered and the filtrate is evaporated using a Buchi evaporation apparatus. The resulting residue, 83 gm., is then mixed, and distilled under reduced pressure. Two fractions are collected:

| Fraction | Temperature/Pressure | Quantity of Fraction |
|---|---|---|
| No. 1 | 40–49°C/2 mm. Hg. | 53.8 gm. |
| No. 2 | 115–120°C/2 mm. Hg. | 8.9 gm. |

Fraction 2 contains substantially all 3-(cyclohexyl methyl) pyridine confirmed by mass spectral and NMR analyses. Mass spectral analysis is as follows: m/e = 93, 55, 41, 175, 39 and 107.

EXAMPLE XVII

PREPARATION OF 4-(CYCLOHEXYL METHYL) PYRIDINE

Into a two liter flask equipped with a stirrer, addition funnel and Dry ice condenser, the following materials are placed:

| Liquid Ammonia | 500 ml. |
|---|---|
| Sodamide | 22 gm. |

The ammonia-sodamide mixture is stirred for a period of 5 minutes after which period 46.5 gm. of 4-methyl pyridine is added over a period of 10 minutes. The green color of the resulting mixture, indicates the presence of the 4-methyl pyridine anion. After stirring the reaction mass for a period of five minutes, 81.5 gm. of cyclohexyl bromide is added thereto with an equal volume of diethyl ether over a period of 15 minutes. The reaction mass is stirred for a period of 1 hour and then the reaction is terminated by means of addition thereto of 30 gm. of solid ammonium chloride. By means of a steam bath, the ammonia is removed after one liter of diethyl ether is added. The ether layer is decanted and the residual solid is washed with three 200 ml. portions of diethyl ether. The ether portions are then combined, dried over anhydrous sodium sulfate and the mixture is then filtered. The filtrate is evaporated using a Buchi evaporator yielding 102.5 gm. of residue. The residue is distilled using a semi-micro distillation apparatus yielding three fractions as follows:

| Fraction | Temperature/Pressure | Quantity of Fraction |
|---|---|---|
| No. 1 | 30–50°C/2 mm. Hg. | 46.7 gm. |
| No. 2 | 115–120°C/2 mm. Hg. | 30.2 gm. |
| No. 3 | 120–121°C/2 mm. Hg. | 9.3 gm. |

Fractions 2 and 3 contain substantially all 4-(cyclopentyl methyl) pyridine as confirmed by means of mass spectral and NMR analyses. Mass spectral analysis is as follows: m/e = 93, 39, 41, 27, 94, 132 and 161.

EXAMPLE XVIII

BIRCH BEER FLAVOR FORMULATION

The following mixture is prepared:

| Parts by Weight | Ingredient |
|---|---|
| 90.0 | Oil of Birch Sweet |
| 1.0 | Cyclohexyl methyl pyrazine |
| 0.35 | Oil of Cinnamon |
| 0.1 | Oil of Allspice |
| 0.35 | Oil of Cloves |
| 0.35 | Oil of Bay |
| 0.001 | Oil of Hops |
| 0.8 | Vanillin |
| 7 | Ethyl Alcohol (95% aqueous) |
| 100.0 | |

The addition to this birch beer formulation of cyclohexyl methyl pyrazine causes this formulation to have imparted thereto a unique anise/chocolate-like note.

EXAMPLE XIX

BIRCH BEER FLAVOR FORMULATION

The following mixture is prepared:

| Parts by Weight | Ingredient |
|---|---|
| 90.0 | Oil of Birch Sweet |
| 1.0 | Cyclopentyl pyrazinyl ketone |
| 0.35 | Oil of Cinnamon |
| 0.1 | Oil of Allspice |
| 0.35 | Oil of Cloves |
| 0.35 | Oil of Bay |
| 0.001 | Oil of Hops |
| 0.8 | Vanillin |
| 7 | Ethyl Alcohol (95% aqueous) |
| 100.0 | |

The addition of cyclopentyl pyrazinyl ketone to this birch beer formulation imparts to it an anise/chocolate-like note.

EXAMPLE XX

BRICH BEER FLAVOR FORMULATION

The following mixture is prepared:

| Parts by Weight | Ingredient |
| --- | --- |
| 90.0 | Oil of Birch Sweet |
| 1.0 | Cycloheptyl Methyl Pyrazine |
| 0.35 | Oil of Cinnamon |
| 0.1 | Oil of Allspice |
| 6.35 | Oil of Cloves |
| 6.35 | Oil of Bay |
| 0.001 | Oil of Hops |
| 0.8 | Vanillin |
| 7 | Ethyl Alcohol (95% aqueous) |
| 100.0 | |

The addition of the cycloheptyl methyl pyrazine to this birch beer formulation imparts thereto an anise/chocolate-like note.

EXAMPLE XXI

COCOA FLAVOR

The following mixture is prepared:

| Parts by Weight | Ingredient |
| --- | --- |
| 1.0 | Dimethyl Sulfide |
| 0.5 | Isobutyl Acetate |
| 0.5 | Isoamyl Acetate |
| 0.5 | Phenyl Ethyl Acetate |
| 0.05 | Diacetyl |
| 0.25 | Furfural |
| 0.1 | Cyclohexyl Pyrazinyl Ketone |
| 0.5 | Isoamyl Alcohol |
| 0.5 | Gamma Butyrolactone |
| 1.0 | Acetophenone |
| 1.0 | Benzaldehyde |
| 3.0 | Maltol |
| 3.5 | Phenyl Ethyl Alcohol |

The addition of the cyclohexyl pyrazinyl ketone to this formulation imparts a unique bitter, cocoa powder note as well as body to the flavor.

EXAMPLE XXII

The following Tuberose Perfume formulation is prepared:

| Parts by Weight | Ingredient |
| --- | --- |
| 10 | Benzoic Acid |
| 5 | Balsum Peru |
| 3 | Methyl anthranilate |
| 5 | Mate Absolute |
| 5 | Methyl Coumarin |
| 2 | $C_{18}$ Aldehyde |
| 20 | Benzyl Benzoate |
| .05 | $C_{14}$ Aldelyde |
| 2 | $C_{15}$ Jasmone |
| 5 | Farnesol |
| 2 | Nerolidol |
| 3 | Benzyl Acetate |
| 2 | Neryl Acetate |
| 2 | Ylang Extra |
| 10 | Benzyl Alcohol |
| 10 | Linalool |
| 3 | Nerol |
| 3 | Eugenol |
| 10 | Ethyl Laurate |
| 5 | Cycloheptyl Methyl Pyrazine |
| 107.5 | |

The addition of the Cycloheptyl Methyl Pyrazine to this Tuberose formulation imparts to is a natural, green, floral, fatty-waxy note so necessary in Tuberose.

EXAMPLE XXIII

The following Hyacinth Perfume is prepared:

| Parts by Weight | Ingredient |
| --- | --- |
| 40 | Cinnamic Alcohol |
| 20 | Phenyl Ethyl Cinnamate |
| 30 | Heliotropin |
| 20 | Musk Ketone |
| 15 | Dimethyl Hydroquinone |
| 30 | Galbanum Coeur |
| 1 | Indol |
| 70 | 4-(4-methyl-4-hydroxy amyl) $\Delta^3$ cyclohexene carboxaldehyde |
| 50 | Amyl Cinnamic Aldehyde |
| 20 | Hexyl Cinnamic Aldehyde |
| 100 | Phenyl Ethyl Alcohol |
| 20 | Benzyl Alcohol |
| 40 | Benzyl Acetate |
| 10 | Rhodinol Coeur |
| 20 | Nerol |
| 15 | Aubepine |
| 10 | Benzyl Salicylate |
| 10 | Ylang Extra |
| 5 | Dimethyl Anthranilate |
| 10 | Cinnamyl Acetate |
| 30 | Nerolidol |
| 10 | Eugenol |
| 5 | Methyl Eugenol |
| 20 | Isoeugenol |
| 10 | Terpineol |
| 5 | Cyclohexyl Methyl Pyrazine |
| 616 | |

The addition of the cyclohexyl methyl pyrazine to this perfume formulation imparts a sweet, ethereal, green floral note so necessary for hyacinth.

EXAMPLE XXIV

The following Narcisse perfume formulation is prepared:

| Parts by Weight | Ingredient |
| --- | --- |
| 30 | Heliotropine |
| 7 | Para Cresyl Phenyl Acetate |
| 15 | Acetyl Isoeugenol |
| 5 | Benzyl Acetate |
| 4 | Ylang Extra |
| 10 | Isoeugenol |
| | Para Cresol |
| 20 | Nerol |
| 30 | Phenyl Ethyl Alcohol |
| 30 | Terpineol |
| 30 | Geraniol Coeur |
| 40 | Linalool |
| 65 | Benzyl Alcohol |
| 3 | Pyrazinyl Cyclopentyl Ketone |

The addition of the Cyclopentyl Pyrazinyl Ketone to this narcisse formulation imparts to it a green, floral top note modified by tobacco nuance so typical of "narcisse montaigne".

EXAMPLE XXV

PREPARATION OF SOAP COMPOSITION

One hundred grams of soap chips are mixed with one gram of the perfume composition of Example XXIV until a substantially homogeneous composition is obtained. The perfumed soap composition exhibits the narcisse fragrance of which the green, floral top note modified with a tobacco nuance is a necessary part.

EXAMPLE XXVI

PREPARATION OF A DETERGENT COMPOSITION

A total of 100 grams of a detergent powder is mixed with 0.15 grams of the perfume composition of Example XXII until a substantially homogeneous composition is obtained. This composition exhibits a Tuberose fragrance in which the green, floral, fatty-waxy note is a necessary part.

EXAMPLE XXVII

PREPARATION OF A COSMETIC POWDER COMPOSITION

A cosmetic powder is prepared by mixing a ball mill 100 grams of talcum powder with 0.25 grams of Cyclohexyl Methyl Pyrazine. The powder has an excellent green, floral aroma.

EXAMPLE XXVIII

PERFUMED LIQUID DETERGENT

Concentrated liquid detergents with rich green, floral characteristics are prepared containing 0.10, 0.15 and 0.20% Cyclohexyl Methyl Pyrazine. They are prepared by adding and homogeneously mixing the appropriate quantity of Cyclohexyl Methyl Pyrazine in the liquid detergent. The detergents all posses green, floral aromas, the intensity increasing with greater concentration of Cyclohexyl Methyl Pyrazine.

EXAMPLE XXIX

Pyrazine Cyclopentyl Ketone is incorporated in a cologne at a concentration of 2.5% in 85% aqueous ethanol; and into a handkerchief perfume at a concentration of 20% in 95% ethanol. A distinct and definite green, floral, aroma is imparted to the cologne and to the handkerchief perfume.

EXAMPLE XXX

The composition of Example XXIII is incorporated in a cologne at a concentration of 2.5% in 85% aqueous ethanol; and into a handkerchief perfume at a concentration of 20% (in 95% aqueous ethanol). The composition of Example XXIII affords a distinct and definite hyacinth fragrance to the handkerchief perfume and cologne.

EXAMPLE XXXI

The tobacco flavoring formulation is prepared by admixing the following ingredients:

| Parts by Weight | Ingredient |
| --- | --- |
| 83.34 | Natural Burley Tobacco Extract (Using ethanol) |
| .33 | 3-Acetyl Pyridine |
| .20 | 4-Isobutyl Pyridine |
| 2.00 | 4-Acetyl Pyridine |
| .20 | 2-Isobutyl Pyrazine |
| .33 | Cyclopentyl Methyl Pyrazine |
| .33 | 2-Octyl Furan |
| .20 | Butyric Acid |
| .20 | N-2-Thiazyl Pyrrole |
| .20 | N-Methyl-2-Acetyl Pyrrole |
| 12.67 | 95% Aqueous Ethanol |
| 100.00 | | i. At the rate of 500 part per million, to each cigarette is added the above formulation. The use of the cyclopentyl methyl pyrazine in this formulation enhances the natural tobacco character causing the tobacco to have a sweeter taste and aroma prior to and on smoking.

ii. At the rate of 2000 parts per million, to each cigarette, is added the above formulation. The use of the cyclopentyl methyl pyrazine causes the tobacco to have a distinct and natural rich taste prior to smoking and on smoking.

iii. At the rate of 4000 ppm, the above formulation when added to burley tobacco converts its flavor and aroma to that of Black tobacco.

EXAMPLE XXXII

A tobacco flavoring formulation is prepared by admixing the following ingredients:

| Parts by Weight | Ingredient |
| --- | --- |
| 83.34 | Natural Black Tobacco Extract (Using Methanol) |
| .24 | 3-Acetyl Pyridine |
| .15 | 4-Isobutyl Pyridine |
| 1.50 | 4-Acetyl Pyridine |
| .15 | 22-Isobutyl Pyrazine |
| .25 | Cyclopentyl Methyl Pyrazine |
| .25 | 2-Octyl Furan |
| .15 | Butyric Acid |
| .55 | N-2-Thiazyl Pyrrole |
| .15 | N-Methyl-2-Acetyl Pyrrole |
| 13.25 | 95% Aqueous Ethanol |
| 100.00 | |

The above formulation is added to smoking tobacco (bright, burley, turkish, homogenized tobacco). The tobacco is then formulated into cigarettes by the usual manufacturing procedures:

i. At the rate of 500 part per million, to each cigarette is added the above formulation. The use of the cyclopentyl methyl pyrazine in this formulation enhances the natural tobacco character causing the tobacco to have a sweeter taste and aroma prior to and on smoking.

ii. At the rate of 2000 parts per million, to each cigarette, is added the above formulation. The use of the cyclopentyl methyl pyrazine causes the tobacco to have a distinct and natural rich taste prior to smoking and on smoking.

iii. At the rate of 4000 ppm, the above formulation when added to burley tobacco converts its flavor and aroma to that of Black tobacco.

EXAMPLE XXXIII

PREPARATION OF CYCLOHEXYL PYRAZINYL CARBINOL

Into a 12 liter flask equipped with stirrer, thermometer, oxygen sparger and two bubblers, the following ingredients are added:

| | |
| --- | --- |
| Dimethyl Sulfoxide | 3,340 gm. |
| Potassium t-butoxide | 622 gm. |
| t-Butanol | 6,672 gm. |

While maintaining the reaction mass at 16°–20°C, 970 gm. of cyclohexyl methyl pyrazine is added. Oxygen is sparged into the mass while maintaining same, a temperature of between 17°C and 31°C over a period of 6 hours. 8300 ml. of water and ice is then added to the mass. The reaction mass is then extracted with four 1 liter portions of methylene chloride twice. The solvent is recovered and the product is rushed over and then redistilled at a vapor temperature of 117°–123°C and a pressure of 2 mm. Hg. (reflux ratio 3:1). The structure of the resultant product as being cyclohexyl pyrazinyl carbinol is confirmed by IR, NMR and mass spectral analyses. Mass spectral analysis is as follows: m/e = 110, 55, 41, 109 and 27.

The cyclohexyl pyrazinyl carbinol has a fruity citrus floral green taste and fruity citrus fatty aroma. Its fragrance has a strong citrusy note.

EXAMPLE XXXIV

PROCESS FOR PREPARING PYRAZINYL CYCLOHEXYL KETONE

Into a 250 ml. flask fitted with a stir, thermometer and reflux condenser, the following materials are placed:

| | |
|---|---|
| Pyrazinyl cyclohexyl carbinol prepared according to the process of Example XXXIII (84.8%) | 9.6 gm. (0.042 moles) |
| Activated manganese dioxide | 9.7 gm. (0.11 moles) |
| Carbon tetrachloride | 100 ml. |

The reaction mass is heated to reflux and reflux is continued for a period of 1 hour and 30 minutes. At the end of the 1 hour and 30 minute reflux period, the reaction mass is filtered and the solution is mixed with 4 gm. of Primol and distilled on a 3 inch micro vigreaux column at a vapor temperature of 112°C and a pressure of 1.00 mm. Hg. The resulting product, (yield: 45.0%) is confirmed by IR, NMR and mass spectral analyses to be pyrazinyl cyclohexyl ketone. The mass spectral analysis is as follows: m/e = 80, 55, 41, 52, 190 and 39.

EXAMPLE XXXV

TOBACCO FORMULATION CONTAINING PYRAZINYL CYCLOHEXYL KETONE

A tobacco formula is prepared as follows:

| Ingredient | Parts by Weight |
|---|---|
| Bright | 40.1 |
| Burley | 24.9 |
| Maryland | 1.1 |
| Turkish | 11.6 |
| Stem (flue-cured) | 14.2 |
| Glycerine | 2.8 |
| Water | 5.3 |

The following tobacco flavor formulation is then intimately admixed with the above-mentioned tobacco formulation and after such admixing the tobacco is formed into cigarettes. Fifty such cigarettes are formed:

| Ingredients | Parts by Weight |
|---|---|
| Ethyl butyrate | 0.05 |
| Ethyl valerate | 0.05 |
| Maltol | 2.00 |
| Cocoa Extract | 26.00 |
| Coffee Extract | 10.00 |
| Ethyl Alcohol (95% aqueous) | 20.00 |
| Water | 41.90 |

The above-mentioned tobacco flavor is applied at the rate of 0.2% up to 0.5% to the tobacco. Fifty cigarettes are formulated and of the 50 cigarettes, 25 remain untreated and labeled control. The other 25 cigarettes are treated with 500 and 1,000 ppm of pyrazinyl cyclohexyl ketone. The cigarettes so treated with pyrazinyl cyclohexyl ketone are labeled as experimental cigarettes.

The control and experimental cigarettes are evaluated by compared comparison and the results are as follows:

The experimental cigarettes are found to be more aromatic and sweeter in aroma. In smoke, the experimental cigarettes are found to be more aromatic, sweeter, less harsh in the mouth and throat and to have more body (i.e., density and fullness of smoke). The high level (1,000 ppm) experimental cigarettes are found to be slightly chocolate-vanillin like in taste. All cigarettes are evaluated for smoke flavor with a 20 mm cellulose acetate filter.

Conclusion: Pyrazinyl cyclohexyl ketone enhances the tobacco like taste and aroma of a blended cigarette.

What is claimed is:
1. Pyrazinyl cyclohexyl ketone.
2. Pyrazinyl cyclopentyl ketone.

* * * * *